United States Patent
Kuzuhara et al.

(10) Patent No.: US 12,554,057 B2
(45) Date of Patent: Feb. 17, 2026

(54) OPTICAL SYSTEM AND IMAGE DISPLAY DEVICE

(71) Applicant: Panasonic Intellectual Property Management Co., Ltd., Osaka (JP)

(72) Inventors: Satoshi Kuzuhara, Osaka (JP); Kazuhiro Minami, Osaka (JP); Hiroaki Okayama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 251 days.

(21) Appl. No.: 18/240,764

(22) Filed: Aug. 31, 2023

(65) Prior Publication Data

US 2023/0408746 A1    Dec. 21, 2023

Related U.S. Application Data

(63) Continuation of application No. PCT/JP2021/040064, filed on Oct. 29, 2021.

(30) Foreign Application Priority Data

Mar. 5, 2021    (JP) .................. 2021-035695

(51) Int. Cl.
- *F21V 8/00* (2006.01)
- *G02B 27/00* (2006.01)
- *G02B 27/01* (2006.01)

(52) U.S. Cl.
CPC ......... *G02B 6/0016* (2013.01); *G02B 6/0036* (2013.01); *G02B 27/0075* (2013.01); *G02B 27/0172* (2013.01)

(58) Field of Classification Search
None
See application file for complete search history.

(56) References Cited

U.S. PATENT DOCUMENTS

| | | | |
|---|---|---|---|
| 9,933,684 B2 * | 4/2018 | Brown | G02B 5/1814 |
| 10,067,347 B2 * | 9/2018 | Vallius | G02B 6/0016 |

(Continued)

FOREIGN PATENT DOCUMENTS

| | | |
|---|---|---|
| CN | 109581669 | 4/2019 |
| JP | 2010-44172 | 2/2010 |

(Continued)

OTHER PUBLICATIONS

Translation of the International Preliminary Report on Patentability issued Sep. 7, 2023 in International Application No. PCT/JP2021/040064.

(Continued)

*Primary Examiner* — Jerry Rahll
(74) *Attorney, Agent, or Firm* — Wenderoth, Lind & Ponack, L.L.P.

(57) ABSTRACT

An optical system includes: a projection optical system for projecting an image light ray output from a display element and forming an image; and a light guide including an in-coupling region for guiding the ray to an inside of the guide and allowing it to travel in a first axis direction within the guide, and a propagation region for allowing the ray from the in-coupling region to propagate in the direction of the first axis, and allowing part of the ray to travel in a predetermined direction including a directional component of a second axis perpendicular to the first axis. In an optical path of the ray, a distance from the projection optical system to an entrance pupil of the projection optical system relative to the element in a plane perpendicular to the first axis is longer than a distance from the projection optical system to the in-coupling region.

15 Claims, 14 Drawing Sheets

(56) References Cited

U.S. PATENT DOCUMENTS

| | | | |
|---|---|---|---|
| 10,429,645 B2 | 10/2019 | Vallius | |
| 2012/0086623 A1 | 4/2012 | Takagi et al. | |
| 2016/0370693 A1* | 12/2016 | Watanabe | G03B 21/147 |
| 2017/0192230 A1* | 7/2017 | Miyazaki | G02B 27/0081 |
| 2018/0373115 A1 | 12/2018 | Brown et al. | |
| 2019/0121023 A1 | 4/2019 | Tervo | |
| 2020/0049999 A1* | 2/2020 | Takeda | G02B 27/0172 |
| 2020/0183079 A1* | 6/2020 | Leister | G02F 1/29 |
| 2021/0026140 A1 | 1/2021 | Kasegawa | |

FOREIGN PATENT DOCUMENTS

| | | |
|---|---|---|
| JP | 2012-83458 | 4/2012 |
| JP | 2017-90561 | 5/2017 |
| WO | 2019/176438 | 9/2019 |

OTHER PUBLICATIONS

European Search Opinion issued Feb. 25, 2025 in corresponding European Patent Application No. 21928383.5.
Extended European Search Report issued Jul. 18, 2024 in European Application No. 21928383.5.
International Search Report issued in International Application No. PCT/JP2021/040064 on Jan. 18, 2022, with English translation.

\* cited by examiner

OPTICAL SYSTEM AND IMAGE DISPLAY DEVICE

CROSS-REFERENCE TO RELATED APPLICATIONS

The present application is a continuation of PCT/JP2021/040064 filed Oct. 29, 2021, which claims priority to Japanese Patent Application No. 2021-035695, filed on Mar. 5, 2021, the entire contents of which are incorporated herein by reference.

TECHNICAL FIELD

The present disclosure relates to optical systems and image display devices.

BACKGROUND ART

Patent Literature 1 discloses an optical element (optical system) including a waveguide (light guide) for expanding an exit pupil in two directions. The optical element includes three diffractive optical elements (DOEs). The first DOE is configured to couple a beam from an imager into the waveguide. The second DOE expands the exit pupil in a first direction along a first coordinate axis. The third DOE expands the exit pupil in a second direction along a second coordinate axis and couples light out of the waveguide.

CITATION LIST

Patent Literature

PATENT LITERATURE 1: U.S. Ser. No. 10/429,645 B

SUMMARY OF INVENTION

Technical Problem

The optical element disclosed in Patent Literature 1 is used for head mounted displays, for example. Regarding the head mounted displays, depending on how to use the optical element, there may be a demand for downsizing the waveguide of the optical element.

The present disclosure provides an optical system and an image display device capable of downsizing a light guide.

Solution to Problem

An optical system according to an embodiment of the present disclosure includes: a projection optical system for projecting an image light ray which is output from a display element and forms an image; and a light guide for guiding the image light ray projected by the projection optical system toward a field of view region of a user as a virtual image. The light guide includes: an in-coupling region for guiding the image light ray to an inside of the light guide and allowing the image light ray to travel in a direction of a first axis within the light guide; and a propagation region for allowing the image light ray from the in-coupling region to propagate in the direction of the first axis, and allowing part of the image light ray to travel in a predetermined direction including a directional component of a second axis perpendicular to the first axis. In an optical path of the image light ray projected by the projection optical system, a distance from the projection optical system to an entrance pupil of the projection optical system relative to the display element in a plane perpendicular to the first axis is longer than a distance from the projection optical system to the in-coupling region.

An image display device according to one aspect of the present disclosure includes the above optical system and the display element.

Advantageous Effects of Invention

Aspects of the present disclosure enables downsizing a light guide.

DESCRIPTION OF EMBODIMENTS

Hereinafter, embodiments will be described in detail with reference to appropriate drawings. Note that, description more detailed than necessary will be omitted. For example, detailed description of well-known matters or duplicate description of substantially the same components may be omitted. This aims to avoid the following description from becoming more redundant than necessary and to facilitate understanding of persons skilled in the art. The inventor(s)

provides the following description and attached drawings for making persons skilled in the art understand the present disclosure only and has no intention to limit subject matters claimed in claims.

1. Embodiments

1.1 Outline

Figure 1:
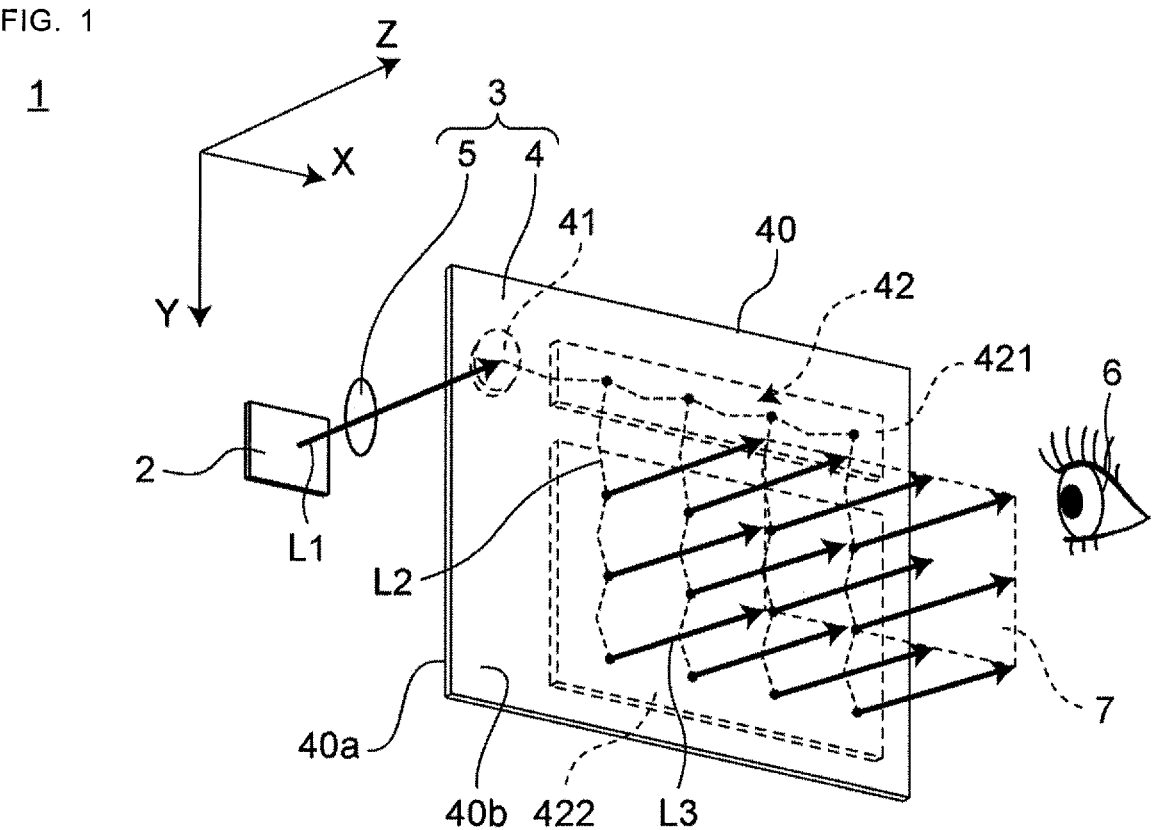
FIG. 1 is a schematic view of a configuration example of an image display device including an optical system according to one embodiment.

FIG. 1 is a schematic view of a configuration example of an image display device 1. The image display device 1 is, for example, a head mounted display (HMD) which is mounted on a user's head and displays an image (picture). Hereinafter, directions regarding the image display device 1 are described based on an X axis, a Y axis, and a Z axis shown in FIG. 1. The X axis corresponds to a horizontal direction, and the Y axis corresponds to a vertical direction. The Z axis corresponds to a forward/backward direction of a user. In the present disclosure, a "direction of _ axis" means a direction which passes an arbitrary point and is parallel to the _ axis. In the present disclosure, expressions "travel in _ direction" and "propagate in _ direction" used in relation to light rays mean that a light ray forming an image travels in the _ direction as a whole and therefore light beams included in the light ray forming the image may be permitted to be inclined relative to the direction. For example, regarding a "light ray traveling in _ direction", it is sufficient that a main light beam of this light is directed in the _ direction, and auxiliary beams of this light may be inclined relative to the _ direction.

Figure 2:
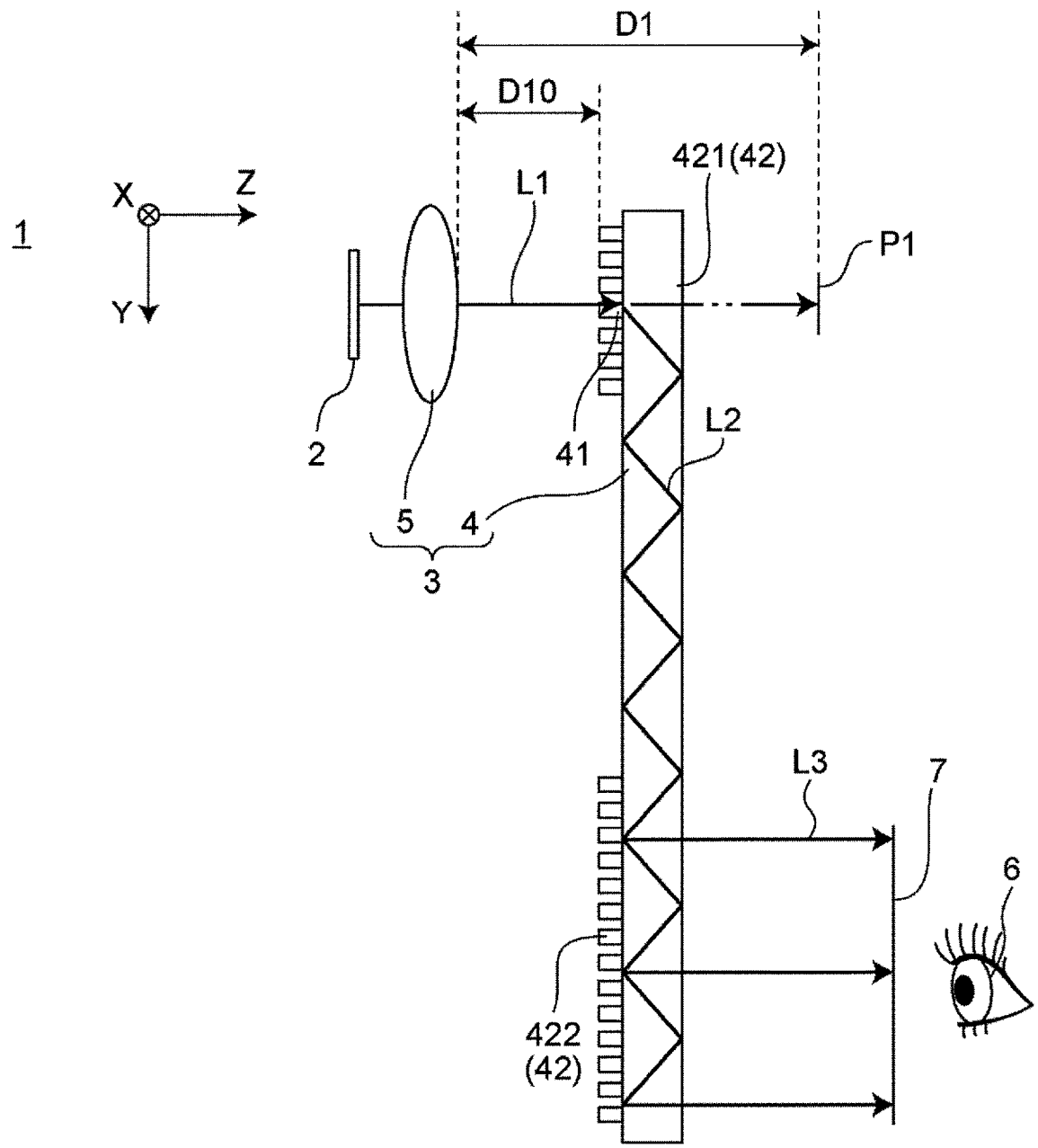
FIG. 2 is a schematic view in a YZ plane of the image display device of FIG. 1.

As shown in FIG. 1, the image display device 1 includes a display element 2 and an optical system 3. The display element 2 is configured to output an image light ray L1 forming an image. The optical system 3 includes a light guide 4 and a projection optical system 5. The projection optical system 5 is configured to project the image light ray L1 which is output from the display element 2 and forms an image. The light guide 4 is configured to guide the image light ray L1 projected by the projection optical system 5, toward a field of view region 7 of a user as a virtual image. The light guide 4 includes an in-coupling region 41 and a propagation region 42. The in-coupling region 41 is configured to guide the image light ray L1 to an inside of the light guide 4 and allow the image light ray L1 to travel in a direction of a first axis (the X axis in the present embodiment) within the light guide 4. The propagation region 42 is configured to allow the image light ray L1 from the in-coupling region 41 to propagate in the direction of the first axis and allow part (L2) of the image light ray L1 to travel in a predetermined direction (a direction of a second axis) including a directional component of a second axis (the Y axis in the present embodiment) perpendicular to the first axis. FIG. 2 is a schematic view in a YZ plane of the image display device 1 of FIG. 1. As shown in FIG. 2, in an optical path of the image light ray L1 projected by the projection optical system 5, a distance D1 from the projection optical system 5 to an entrance pupil P1 of the projection optical system 5 relative to the display element 2 in a plane perpendicular to the first axis (the YZ plane perpendicular to the X axis, in the present embodiment) is longer than a distance D10 from the projection optical system 5 to the in-coupling region 41.

In the present disclosure, an "entrance pupil of a projection optical system relative to a display element" corresponds to an aperture of the projection optical system. A "position of the entrance pupil of the projection optical system relative to the display element" is a position where a central light beam of light beams which are emitted from respective points of the display element and constitute the image light ray L1 cross an optical axis of the projection optical system when viewed in a section parallel to the optical axis.

Figure 3:
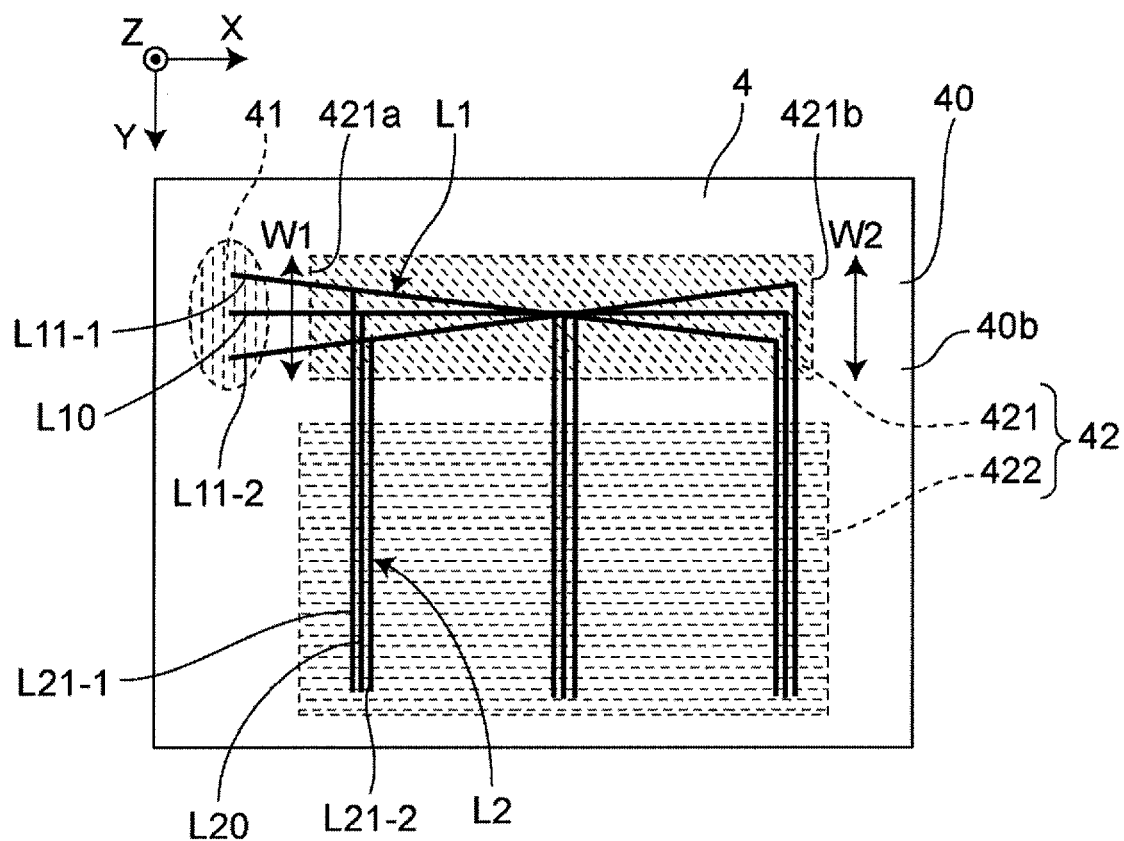
FIG. 3 is a schematic view in an XY plane of a configuration example of a light guide of the optical system of FIG. 1.

FIG. 3 is a schematic view in an XY plane of a configuration example of the light guide 4 of the optical system 3 of FIG. 1. In the image display device 1, in the optical path of the image light ray L1 projected by the projection optical system 5, the distance D1 from the projection optical system 5 to the entrance pupil P1 of the projection optical system 5 relative to the display element 2 in a plane perpendicular to the first axis (in the present embodiment, the YZ plane perpendicular to the X axis) is longer than the distance D10 from the projection optical system 5 to the in-coupling region 41. In the present embodiment, the projection optical system 5 and the light guide 4 are arranged in line. Thus, the position of the entrance pupil P1 of the projection optical system 5 relative to the display element 2 in the plane perpendicular to the first axis (the YZ plane perpendicular to the X axis) is on the opposite side of the in-coupling region 41 from the projection optical system 5. The light beams from the respective points of the display element 2 constituting the image light ray L1 converge from the projection optical system 5 to the entrance pupil P1, and diverge from the entrance pupil P1. Therefore, as shown in FIG. 3, it is possible to cause the light beams from the respective points of the display element 2 constituting the image light ray L1 to converge within the propagation region 42. On the other hand, when the distance D1 is shorter than the distance D10 in the optical path of the image light ray L1 projected by the projection optical system 5, the position of the entrance pupil P1 of the projection optical system 5 relative to the display element 2 is on the same side of the in-coupling region 41 as the projection optical system 5. In this case, the light beams from the respective points of the display element 2 constituting the image light ray L1 do not converge but diverge within the propagation region 42. Therefore, according to the image display device 1 of the present embodiment, the light beams from the respective points of the display element 2 constituting the image light ray L1 are made to converge within the propagation region 42. This enables reduction of a size necessary for the propagation region 42 to allow propagation of the image light ray L1 from the display element 2. Consequently, it is possible to downsize the light guide 4.

1.2 Details

Hereinafter, the image display device 1 of the present embodiment will be described in more detail with reference to FIG. 1 to FIG. 6. As shown in FIG. 1, the image display device 1 includes the display element 2 and the optical system 3.

The display element 2 is configured to, in order to display an image (picture), output the image light ray L1 for forming the image. The image light ray L1 includes light beams output from respective points of the display element 2. The respective points of the display element 2 correspond to respective pixels of the display element 2, for example. The display element 2 is positioned or arranged so that an optical axis of the display element 2 is along the Z axis as well as a horizontal direction and a vertical direction of the image displayed by the display element 2 are along the X axis and the Y axis respectively. The optical axis of the display element 2 is an optical axis of the image light ray L1. The optical axis of the image light ray L1 is an optical axis of a light ray output from a center of the display element 2, for example. Examples of the display element 2 may include known displays such as liquid crystal displays, organic EL displays, or the like.

Figure 4:
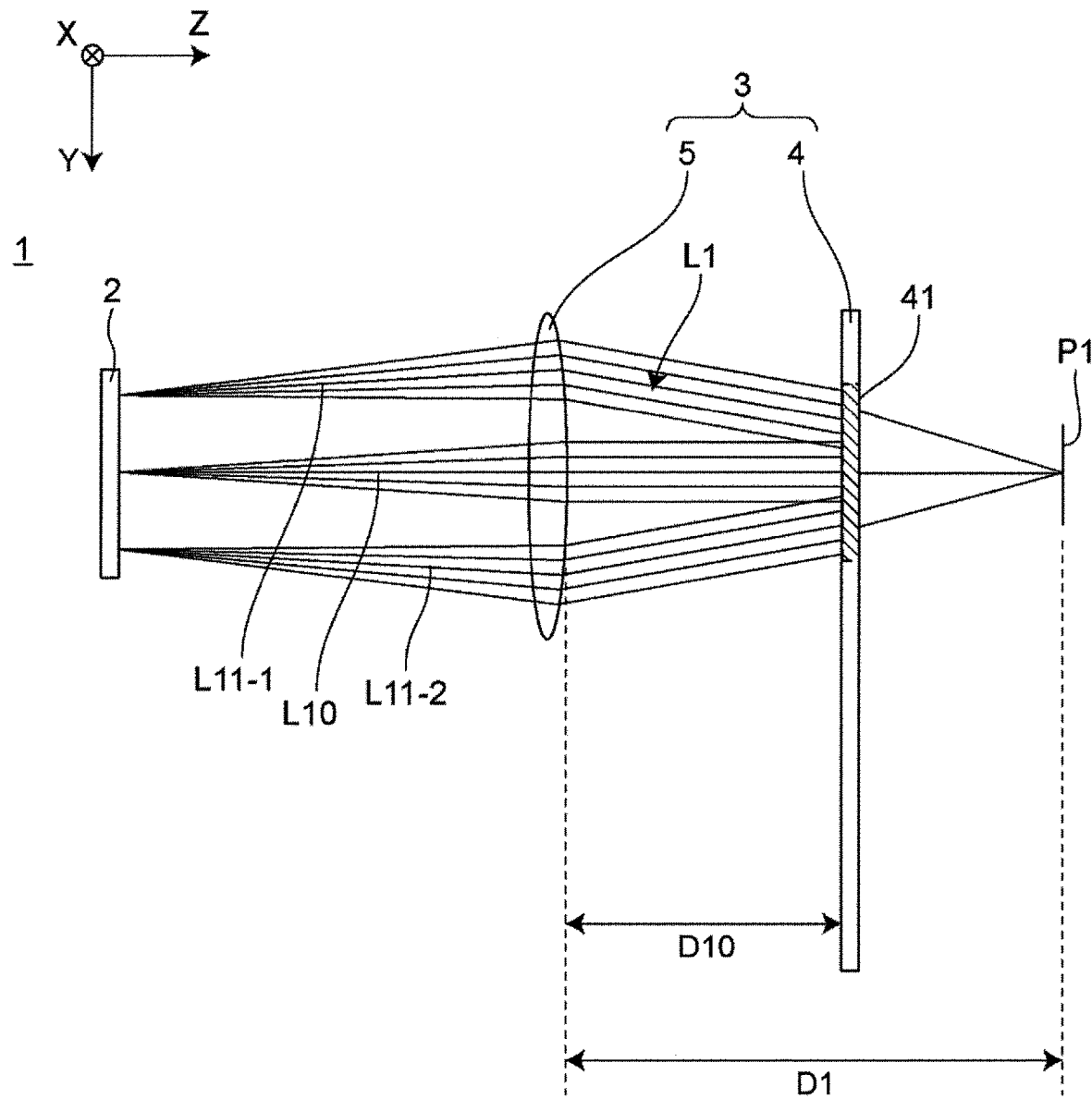
FIG. 4 is an explanatory view of a position of an entrance pupil in the YZ plane of a projection optical system of the image display device of FIG. 1.
Figure 5:
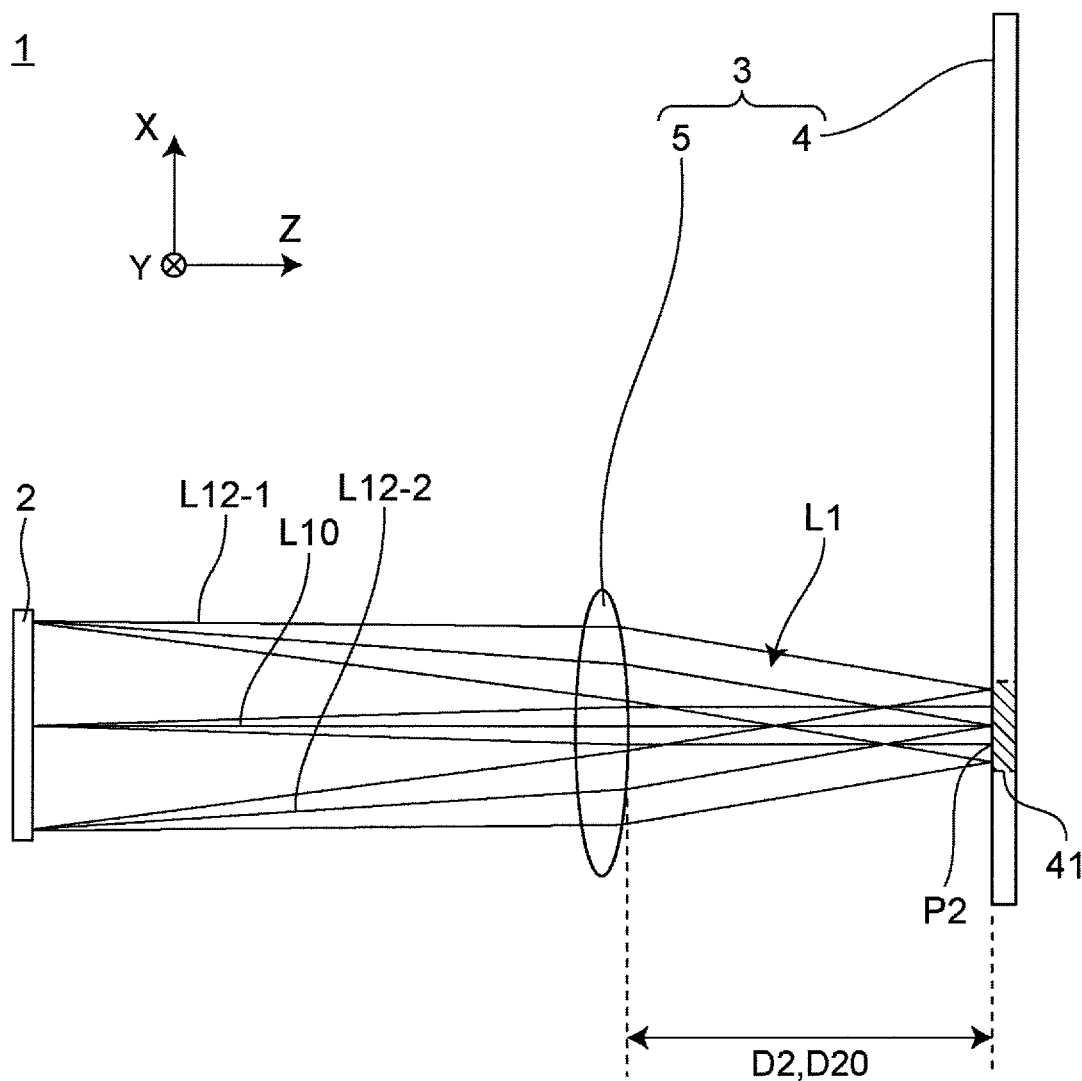
FIG. 5 is an explanatory view of a position of the entrance pupil in the XZ plane of the projection optical system of the image display device of FIG. 1.

In the present embodiments, as shown in FIG. 4 and FIG. 5, the display element 2 has characteristics that the image light ray L1 spreads more widely in the second axis than in the first axis. Therefore, a position of the entrance pupil P1 of the projection optical system 5 relative to the display element 2 in a plane perpendicular to the first axis (the YZ plane perpendicular to the X axis) and a position of an entrance pupil P2 of the projection optical system 5 relative to the display element 2 in a plane perpendicular to the second axis (the XZ plane perpendicular to the Y axis) can be made to be different easily by the projection optical system 5 described below.

As shown in FIG. 1, the optical system 3 is configured to guide the image light ray L1 output from the display element 2 toward the field of view region 7 set relative to eyes 6 of the user. Within the field of view region 7, the user can watch by his or her own eyes 6 the image formed by the display element 2 with the image not being interrupted. Especially, in the present embodiment, the optical system 3 expands the field of view region 7 by utilizing effects of pupil expansion.

As shown in FIG. 1, the optical system 3 includes the light guide 4 and the projection optical system 5.

The light guide 4 is configured to guide the image light ray L1 which is output from the display element 2 and forms the image, toward the field of view region 7 of the user, as a virtual image. The light guide 4 has a plate shape. In detail, the light guide 4 includes a body 40 shaped into a plate. The body 40 is made of transparent material and includes a first surface 40a and a second surface 40b in a thickness direction thereof. As shown in FIG. 1, the light guide 4 is positioned or arranged to direct the first surface 40a toward the display element 2 and direct the second surface 40b toward the field of view region 7 so that a thickness of the body 40 is along the Z axis.

As shown in FIG. 1, the light guide 4 includes the in-coupling region 41 and the propagation region 42 as components or elements for guiding the image light ray L1 from the display element 2 toward the field of view region 7 of the user.

The in-coupling region 41 is configured to guide the image light ray L1 to the inside of the light guide 4 and allow the image light ray L1 to travel in a direction of the first axis within the light guide 4. The in-coupling region 41 is used for coupling between the display element 2 and the light guide 4. The in-coupling region 41 allows external light ray (the image light ray L1) to be incident on the light guide 4 and propagate within the light guide 4 under a total reflection condition. The term "coupling" used herein means allowing propagation inside the light guide 4 under a total reflection condition. In the present embodiment, the first axis is perpendicular to the thickness direction of the light guide 4. In the present embodiment, the first axis is the X axis. The in-coupling region 41 includes a periodic structure causing diffraction of the image light ray L1. The periodic structure of the in-coupling region 41 includes a transmission diffraction grating, for example. The in-coupling region 41 is formed in the first surface 40a of the body 40, for example. The diffraction grating of the in-coupling region 41 may include a plurality of recesses or protrusions which extend along the second axis and are arranged along the first axis at a predetermined interval, for example. Note that, in FIG. 2, only for showing that the in-coupling region 41 includes the periodic structure causing diffraction in an easy-to-under-stand way, protrusions are illustrated to be arranged along the Y axis. The in-coupling region 41 uses diffraction to allow the image light ray L1 to be incident on the light guide 4 to meet a condition where it is totally reflected by the first surface 40a and the second surface 40b. The in-coupling region 41 allows the image light ray L1 to travel in a direction of the first axis (the X axis in the present embodiment) within the light guide 4 (i.e., the body 40) while being totally reflected by the first surface 40a and the second surface 40b.

A size of the in-coupling region 41 is set to allow part or whole of the image light ray L1 from the display element 2 via the projection optical system 5 to be incident on the in-coupling region 41. In the present embodiment, as shown in FIG. 3, the in-coupling region 41 has an ellipse shape in the XY plane and a major axis thereof is along the first axis and a minor axis thereof is along the second axis. This means that a dimension in the second axis (the Y axis) of the in-coupling region 41 is greater than a dimension in the first axis (the X axis) of the in-coupling region 41. Note that, the in-coupling region 41 is not limited to having such an ellipse shape but may have a rectangular shape with the dimension in the second axis (the Y axis) of the in-coupling region 41 being greater than the dimension in the first axis of the in-coupling region 41.

The propagation region 42 includes a first expansion region 421 and a second expansion region 421.

As shown in FIG. 3, the first expansion region 421 is aligned with the in-coupling region 41 in the first axis. The first expansion region 421 is configured to allow the image light ray L1 from the in-coupling region 41 to propagate along the first axis and allow part of the image light ray L1 (an image light ray L2) to travel in the predetermined direction. The predetermined direction is a direction containing a directional component of the second axis perpendicular to the first axis. In the present embodiment, the second axis is perpendicular to the thickness direction of the light guide 4 and the first axis each. In the present embodiment, the second axis is the Y axis. In the present embodiment, the predetermined direction contains the directional component of the second axis only and thus is identical to a direction of the second axis. In the present embodiment, the first expansion region 421 expands a pupil of the image light ray L1 in the first axis. In more detail, as shown in FIG. 3, the first expansion region 421 is configured to replicate the pupil of the image light ray L1 projected by the projection optical system 5 in the first axis to expand the pupil, by dividing the image light ray L1 into a plurality of parallel image light rays L2 traveling in the predetermined direction. The first expansion region 421 is constituted by a periodic structure causing diffraction of the image light ray L1. The periodic structure of the first expansion region 421 includes a reflection diffraction grating, for example. The first expansion region 421 is formed in the first surface 40a of the body 40, for example. The diffraction grating of the first expansion region 421 may include a plurality of recesses or protrusions which extend along a direction inclined relative to the Y axis at 45 degrees in a plane perpendicular to the Z axis and are arranged along a direction inclined relative to the Y axis at 135 degrees in a plane perpendicular to the Z axis at a predetermined interval, for example.

A size of the first expansion region 421 is set to allow part or whole of the image light ray L1 from the in-coupling region 41 to be incident on the first expansion region 421. In the present embodiment, as shown in FIG. 3, the first expansion region 421 has a quadrangular shape in the XY plane. The first expansion region 421 includes a first end 421a and a second end 421b in the first axis. The first end 421a is closer to the in-coupling region 41 than the second end 421b is. In the first expansion region 421, when a width of the optical path at the first end 421a of the image light ray L1 is W1 and a width of the optical path at the second end 421b of the image light ray L1 is W2, the width W1 and the width W2 satisfy a relation of $0.4<W1/W2<1.8$. By the width W1 and the width W2 satisfying the relation of $0.4<W1/W2<1.8$, a region necessary for the first expansion region 421 to allow the image light ray L1 to propagate in a direction of the first axis within the light guide 4 can be decreased and an increase in the size of the in-coupling region 41 can be reduced. Therefore, by making a width at the first end 421a of the first expansion region 421 be equal to the width W1 of the optical path and further making a width at the second end 421b of the first expansion region 421 be equal to the width W2 of the optical path, the size of the first expansion region 421 can be made smaller, and thus it is possible to downsize the light guide 4. A dimension in the first axis (the X axis) of the first expansion region 421 is set in accordance with a dimension in the first axis of the field of view region 7.

As shown in FIG. 2, the second expansion region 422 is positioned to be aligned with the first expansion region 421 in the second axis (the Y axis). The second expansion region 422 is configured to allow the image light ray L2 from the first expansion region 421 to propagate along the predetermined direction and allow part of the image light ray L2 (an image light ray L3) to emerge from the light guide 4 toward the field of view region 7. In the present embodiment, the second expansion region 422 expands the pupil of the image light ray L1 in the second axis. In more detail, as shown in FIG. 2, the second expansion region 422 is configured to replicate the pupil of the image light ray L1 projected by the projection optical system 5 in the second axis to expand the pupil, by dividing the image light ray into a plurality of parallel image light rays L3 traveling from the light guide 4 toward the field of view region 7. The image light ray L3 travels in a direction of the third direction, for example. The second expansion region 422 is constituted by a periodic structure causing diffraction of the image light ray L2. The periodic structure of the second expansion region 422 includes a reflection diffraction grating, for example. The second expansion region 422 is formed in the first surface 40a of the body 40, for example. The diffraction grating of the second expansion region 422 may include a plurality of recesses or protrusions which extend along a direction of the first axis and are arranged along a direction of the second axis at a predetermined interval, for example.

A size of the second expansion region 422 is set to allow part or whole of the image light ray L2 from the first expansion region 421 to be incident on the second expansion region 422. In the present embodiment, as shown in FIG. 3, the second expansion region 422 has a quadrangular shape in the XY plane. A dimension in the first axis (the X axis) of the second expansion region 422 is equal to a dimension in the first axis of the first expansion region 421. A dimension in the second axis (the Y axis) of the second expansion region 422 is set in accordance with a dimension in the second axis of the field of view region 7.

As described above, the light guide 4 is configured to replicate the pupil of the image light ray L1 to expand the pupil, by dividing the image light ray L1 incident on the light guide 4 from the in-coupling region 41 into a plurality of parallel image light rays L2, L3 within the light guide 4 and by allowing them to emerge toward the field of view region 7. In more detail, the light guide 4 includes the in-coupling region 41 and the propagation region 42, and is configured to replicate the pupil of the image light ray L1 in the first axis and the second axis to expand the pupil, by dividing the image light ray L1 incident on the light guide 4 from the in-coupling region 41 into a plurality of parallel image light rays L2, L3 within the light guide 4 by means of the first expansion region 421 and the second expansion region 422 of the propagation region 42 and by allowing them to emerge toward the field of view region 7.

The projection optical system 5 is configured to project the image light ray L1 which is output from the display element 2 and forms the image. By doing so, the projection optical system 5 allows the image light ray L1 from the display element 2 to be incident on the light guide 4. As shown in FIG. 1 and FIG. 2, the projection optical system 5 is located between the display element 2 and the in-coupling region 41 of the light guide 4. The projection optical system 5 is configured to collimate the image light ray L1 from the display element 2 and allow the image light ray L1 to be incident on the in-coupling region 41, for example. The projection optical system 5 allows the image light ray L1 to be incident on the in-coupling region 41 as an approximate collimated light ray. The projection optical system 5 is, for example, a biconvex lens.

The projection optical system 5 is configured so that the distance D1 (see FIG. 4) from the projection optical system 5 to the entrance pupil P1 of the projection optical system relative to the display element 2 in a plane perpendicular to the first axis (the YZ plane perpendicular to the X axis) in the optical path of the image light ray L1 projected by the projection optical system 5 is longer than a distance D2 (see FIG. 5) from the projection optical system 5 to the entrance pupil P2 of the projection optical system 5 relative to the display element 2 in a plane perpendicular to the second axis (the XZ plane perpendicular to the Y axis) in the optical path of the image light ray L1 projected by the projection optical system 5. In the present embodiment, since the projection optical system 5 and the light guide 4 are arranged in a straight line, the position of the entrance pupil P1 of the projection optical system 5 relative to the display element 2 in a plane perpendicular to the first axis (the YZ plane perpendicular to the X axis) is further from the projection optical system 5 than the position of the entrance pupil P2 of the projection optical system 5 relative to the display element 2 in a plane perpendicular to the second axis (the XZ plane perpendicular to the Y axis) is.

Hereinafter, the position of the entrance pupil of the projection optical system 5 will be described with reference to FIG. 4 and FIG. 5. FIG. 4 is an explanatory view of the position of the entrance pupil P1 in the YZ plane of the projection optical system 5 of the image display device 1. FIG. 5 is an explanatory view of the position of the entrance pupil P2 in the XZ plane of the projection optical system 5 of the image display device 1. Note that, in FIG. 4 and FIG. 5, to illustrate the in-coupling region 41 in an easy-to-understand way, part of the light guide 4 corresponding to the in-coupling region 41 is designated by hatching.

Especially, as shown in FIG. 4, in the optical path of the image light ray L1 projected by the projection optical system 5, the distance D1 from the projection optical system 5 to the entrance pupil P1 of the projection optical system 5 relative to the display element 2 in the plane perpendicular to the first axis is longer than the distance D10 from the projection optical system 5 to the in-coupling region 41. Accordingly, in FIG. 4, the position of the entrance pupil P1 of the projection optical system 5 relative to the display element 2 in the plane perpendicular to the first axis (the YZ plane perpendicular to the X axis) is on the opposite side of the in-coupling region 41 from the projection optical system 5. Further, the position of the entrance pupil P1 is set to allow the light beams from the respective points of the display element 2 constituting the image light ray L1 to converge and diverge within the first expansion region 421 of the propagation region 42. In detail, as shown in FIG. 4, the image light ray L1 incident on the in-coupling region 41 from the projection optical system 5 includes a main light beam L10 corresponding to a center of the virtual image, and a plurality of auxiliary light beams L11-1, L11-2, . . . , L11-$n$ (hereinafter collectively designated by reference sign L11) which come close to the main light beam L10 in a direction of the second axis (the Y axis) as traveling from the projection optical system 5 to the in-coupling region 41. As shown in FIG. 3, the plurality of auxiliary light beams L11-1, L11-2 cross the main light beam L10 within the first expansion region 421 of the propagation region 42. As described above, the light beams from the respective points of the display element 2 constituting the image light ray L1 (the main light beam L10 and the auxiliary light beams L11) are made to converge and diverge within the first expansion region 421 of the propagation region 42. This can decrease a size necessary for the propagation region 42 (especially, the first expansion region 421) to allow propagation of the image light ray L1 from the display element 2. The term "cross" used herein means that the main light beam L10 and the auxiliary light beam L11 cross each other when the optical path is projected on a plane including the first axis and the second axis and thus may be in mutual skew positions in a three dimensional space.

Meanwhile, as shown in FIG. 5, in the optical path of the image light ray L1 projected by the projection optical system 5, the distance D2 from the projection optical system 5 to the entrance pupil P2 of the projection optical system 5 relative to the display element 2 in the plane perpendicular to the second axis is equal to a distance D20 from the projection optical system 5 to the in-coupling region 41. Accordingly, in FIG. 5, the position of the entrance pupil P2 of the projection optical system 5 relative to the display element 2 in the plane perpendicular to the second axis (the XZ plane perpendicular to the Y axis) corresponds to a position of the in-coupling region 41 in the first surface 40$a$ of the light guide 4. Therefore, the light beams from the respective points of the display element 2 constituting the image light ray L1 converge on the in-coupling region 41. In detail, as shown in FIG. 5 the image light ray L1 incident on the in-coupling region 41 from the projection optical system 5 includes the main light beam L10 corresponding to the center of the virtual image, and a plurality of auxiliary light beams L12-1, L12-2, . . . , L12-$n$ (hereinafter collectively designated by reference sign L12) which come close to the main light beam L10 in the first axis (the X axis) as traveling from the projection optical system 5 to the in-coupling region 41. The plurality of auxiliary light beams L12 cross the main light beam L10 at the in-coupling region 41.

1.3 Advantageous Effects

As described above, the optical system 3 includes: the projection optical system 5 for projecting the image light ray L1 which is output from the display element 2 and forms the image; and the light guide 4 for guiding the image light ray L1 projected by the projection optical system 5 toward the field of view region 7 of the user as the virtual image. The light guide 4 includes: the in-coupling region 41 for guiding the image light ray L1 to the inside of the light guide 4 and allowing the image light ray L1 to travel in the direction of the first axis within the light guide 4; and the propagation region 42 for allowing the image light ray L1 from the in-coupling region 41 to propagate in the direction of the first axis, and allowing part of the image light ray L1 to travel in the predetermined direction including the directional component of the second axis perpendicular to the first axis. In the optical path of the image light ray L1 projected by the projection optical system 5, the distance D1 to the entrance pupil P1 of the projection optical system 5 relative to the display element 2 in the plane perpendicular to the first axis from the projection optical system 5 is longer than the distance D10 to the in-coupling region 41 from the projection optical system 5. Accordingly, this configuration enables downsizing the light guide 4, especially, the propagation region 42.

In the optical system 3, the light guide 4 has a plate shape. The first axis, the second axis and the predetermined direction each are perpendicular to the thickness direction of the light guide 4. Accordingly, this configuration can decrease the dimension in the second axis of the light guide 4.

In the optical system 3, the image light ray L1 incident on the in-coupling region 41 from the projection optical system 5 includes the main light beam L10 corresponding to the center of the virtual image, and the plurality of auxiliary light beams L11-1, L11-2 which come close to the main light beam L10 in the second axis as traveling from the projection optical system 5 to the in-coupling region 41. The plurality of auxiliary light beams L11-1, L11-2 cross the main light beam L10 within the propagation region 42. Accordingly, this configuration enables downsizing the light guide 4.

In the optical system 3, the distance D1 from the projection optical system 5 to the entrance pupil P1 of the projection optical system 5 relative to the display element 2 in the plane perpendicular to the first axis in the optical path of the image light ray L1 projected by the projection optical system 5 is longer than the distance D2 from the projection optical system 5 to the entrance pupil P2 of the projection optical system 5 relative to the display element 2 in the plane perpendicular to the second axis in the optical path of the image light ray L1. The distance D1 and the distance D2 satisfy a relation of $3.0<D1/D2<100$. Accordingly, this configuration enables appropriate setting of a position where the plurality of auxiliary light beams L11-1, L11-2 cross the main light beam L10 within the propagation region 42, and downsizing the light guide 4.

In the optical system 3, the dimension in the second axis of the in-coupling region 41 is larger than the dimension in the first axis of the in-coupling region 41. Accordingly, this configuration enables downsizing the light guide 4.

In the optical system 3, the propagation region 42 includes the first expansion region 421 which replicates the pupil of the image light ray L1 projected by the projection optical system 5 in the first axis to expand the pupil, by dividing the image light ray L1 into a plurality of parallel image light rays L2 traveling in the predetermined direction. Accordingly, this configuration enables expansion of the pupil in the first axis.

In the optical system 3, the first expansion region 421 includes the first end 421$a$ and the second end 421$b$ in the first axis. The first end 421$a$ is closer to the in-coupling region 41 than the second end 421$b$ is. When the width W1 of the optical path at the first end of the image light ray L1 is designated by W1 and the width of the optical path at the second end of the image light ray L1 is designated by W2, the width W1 and the width W2 satisfy the relation of $0.4<W1/W2<1.8$. Accordingly, this configuration can downsize the first expansion region 421 and thus can downsize the propagation region 42 of the light guide 4.

In the optical system 3, the propagation region 42 allows the image light ray L2 from the first expansion region 421 to propagate in the predetermined direction, and allows part of the image light ray L2 (the image light ray L3) to emerge from the light guide 4 toward the field of view region 7. Accordingly, this configuration can expand the field of view region 7.

In the optical system 3, the propagation region 42 includes the second expansion region 422 which replicates the pupil of the image light ray L1 projected by the projection optical system 5 in the second axis to expand the pupil, by dividing the image light ray L2 from the first expansion region 421 into a plurality of parallel image light rays L3 traveling from the light guide 4 toward the field of view region 7. Accordingly, this configuration enables expansion of the pupil in the second axis.

In the optical system 3, the in-coupling region 41 includes the periodic structure causing diffraction of the image light ray L1. Accordingly, this configuration enables downsizing the light guide 4.

In the optical system 3, the light guide 4 replicates the pupil of the image light ray L1 projected by the projection optical system 5 to expand the pupil, by dividing the image light ray L1 incident on the light guide 4 via the in-coupling region 41 in a plurality of parallel image light rays L1, L2 within the light guide 4 and allowing the plurality of parallel image light rays L1, L2 to emerge toward the field of view region 7. Accordingly, this configuration enables expansion of the pupil.

In the optical system 3, the projection optical system 5 allows the image light ray L1 to be incident on the in-coupling region 41 as an approximate collimated light ray. Accordingly, this configuration enables downsizing the light guide 4.

The image display device 1 described above includes the optical system 3 described above and the display element 2. Accordingly, this configuration enables downsizing the light guide 4.

In the image display device 1, the display element 2 has characteristics that the image light ray L1 spreads more widely in the second axis than in the first axis. According to this configuration, the position of the entrance pupil P1 of the projection optical system 5 relative to the display element 2 in the plane perpendicular to the first axis and the position of an entrance pupil P2 of the projection optical system 5 relative to the display element 2 in the plane perpendicular to the second axis can be made to be different easily by the projection optical system 5.

2. Variations

Embodiments of the present disclosure are not limited to the above embodiment. The above embodiment may be modified in various ways in accordance with designs or the like to an extent that they can achieve the problem of the present disclosure. Hereinafter, some variations or modifications of the above embodiment will be listed. One or more of the variations or modifications described below may apply in combination with one or more of the others.

2.1 Variation 1

Figure 6:
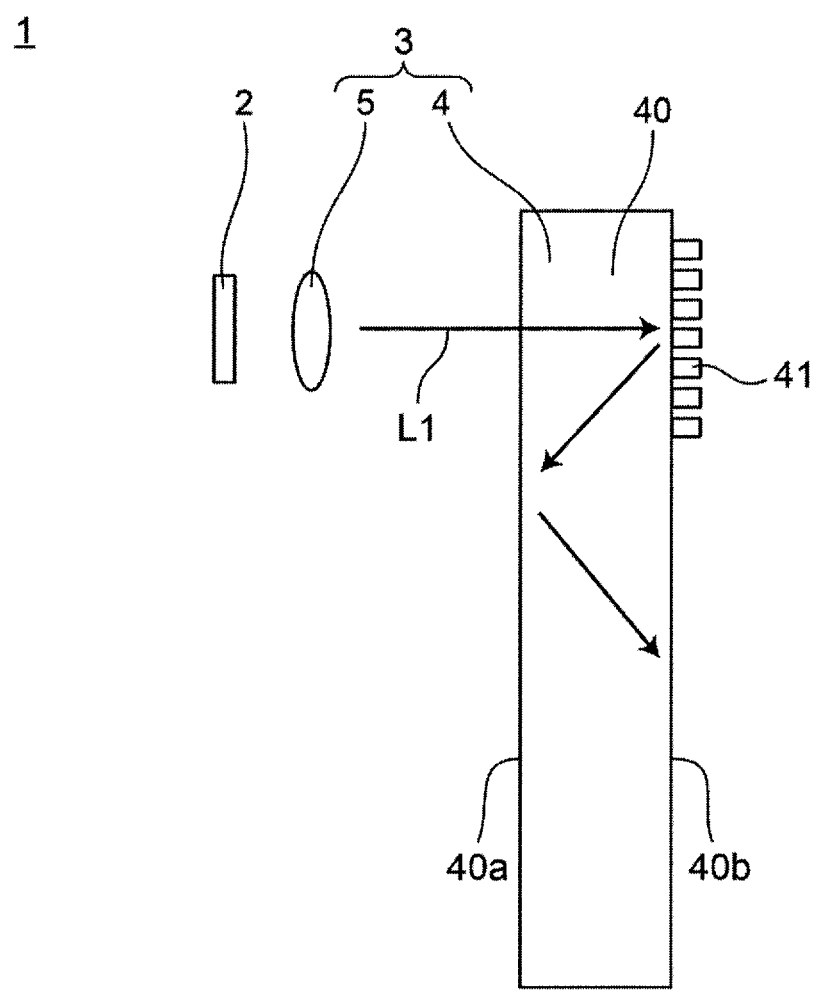
FIG. 6 is a schematic view in the YZ plane of an image display device of variation 1.

FIG. 6 shows the image display device 1 of variation 1. Especially, FIG. 6 is a schematic view in the YZ plane of the image display device 1 of variation 1. The in-coupling region 41 of the light guide 4 of the image display device 1 of variation 1 is different from the in-coupling region 41 of the light guide 4 of the image display device 1 of the above embodiment. The in-coupling region 41 of the light guide 4 of FIG. 6 guides the image light ray L1 to the inside of the light guide 4 and allows the image light ray L1 to travel in the direction of the first axis within the light guide 4. The in-coupling region 41 is constituted by a periodic structure causing diffraction of the image light ray L1. The periodic structure of the in-coupling region 41 includes, for example, a reflection diffraction grating. The in-coupling region 41 is formed in the second surface 40b of the body 40, for example. The diffraction grating of the in-coupling region 41 may include, for example, a plurality of recesses or protrusions which extend along the second axis and are arranged along the first axis at a predetermined interval. Note that, in FIG. 6, only for showing that the in-coupling region 41 includes the periodic structure causing diffraction in an easy-to-understand way, protrusions are illustrated to be arranged along the Y axis. The in-coupling region 41 uses diffraction to allow the image light ray L1 to be incident on the light guide 4 to meet a condition where it is totally reflected by the first surface 40a and the second surface 40b. The in-coupling region 41 allows the image light ray L1 to travel in a direction of the first axis (the X axis in the present embodiment) within the light guide 4 (i.e., the body 40) while being totally reflected by the first surface 40a and the second surface 40b.

2.2 Variation 2

Figure 7:
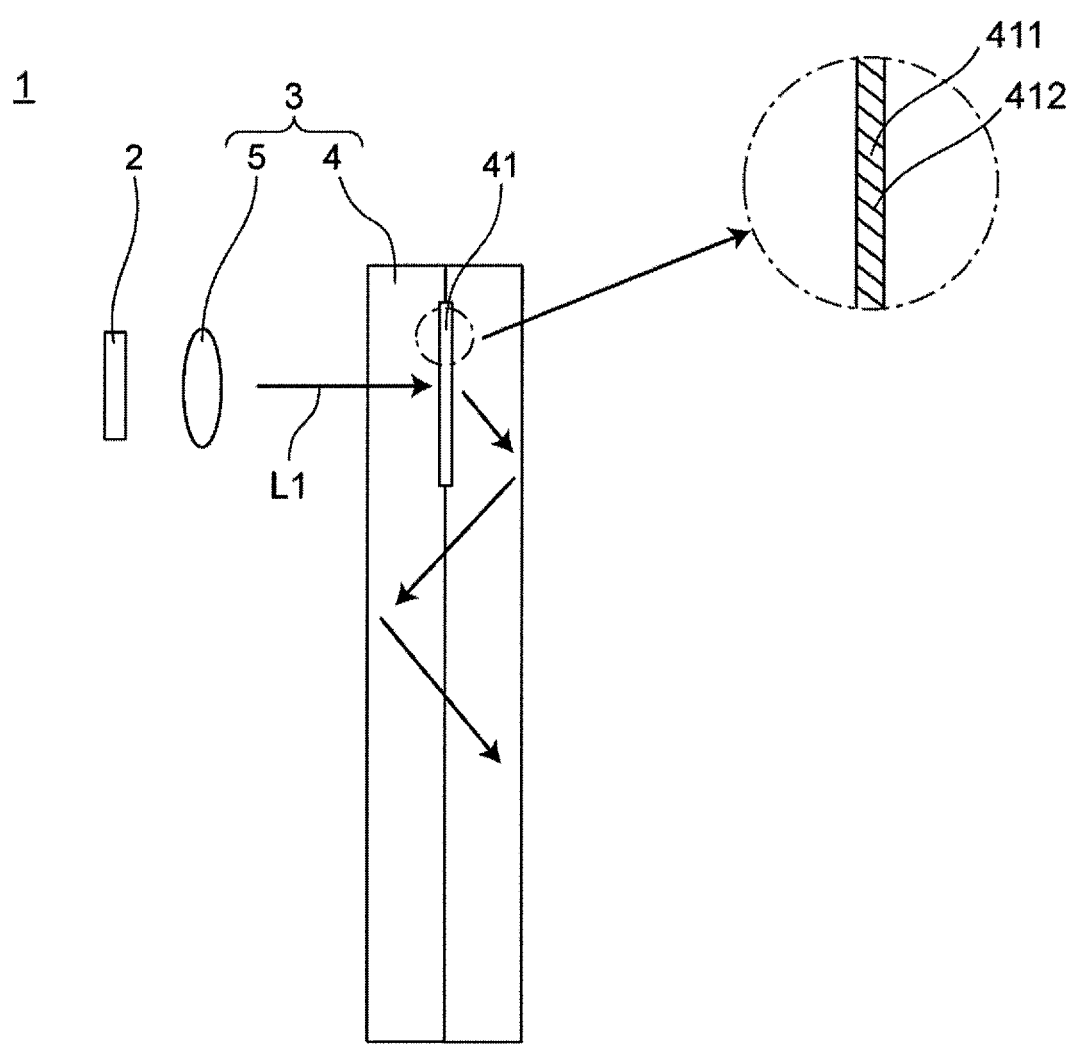
FIG. 7 is a schematic view in the YZ plane of an image display device of variation 2.

FIG. 7 shows the image display device 1 of variation 2. Especially, FIG. 7 is a schematic view in the YZ plane of the image display device 1 of variation 2. The in-coupling region 41 of the light guide 4 of the image display device 1 of variation 2 is different from the in-coupling region 41 of the light guide 4 of the image display device 1 of the above embodiment. The in-coupling region 41 of the light guide 4 of FIG. 7 guides the image light ray L1 to the inside of the light guide 4 and allows the image light ray L1 to travel in the direction of the first axis within the light guide 4. The in-coupling region 41 is constituted by a periodic structure causing diffraction of the image light ray L1. The periodic structure of the in-coupling region 41 includes, for example, a volume hologram (holographic diffraction grating) causing diffraction by periodic modulation of a refractive index. The in-coupling region 41 is formed inside the body 40, for example. The diffraction grating of the in-coupling region 41 has a structure where first portions 411 and second portions 412 which have different diffractive indices are arranged alternately, for example. The in-coupling region 41 uses diffraction to allow the image light ray L1 to be incident on the light guide 4 to meet a condition where it is totally reflected by the first surface 40a and the second surface 40b. The in-coupling region 41 allows the image light ray L1 to travel in a direction of the first axis (the X axis in the present embodiment) within the light guide 4 (i.e., the body 40) while being totally reflected by the first surface 40a and the second surface 40b.

2.3 Variation 3

Figure 8:
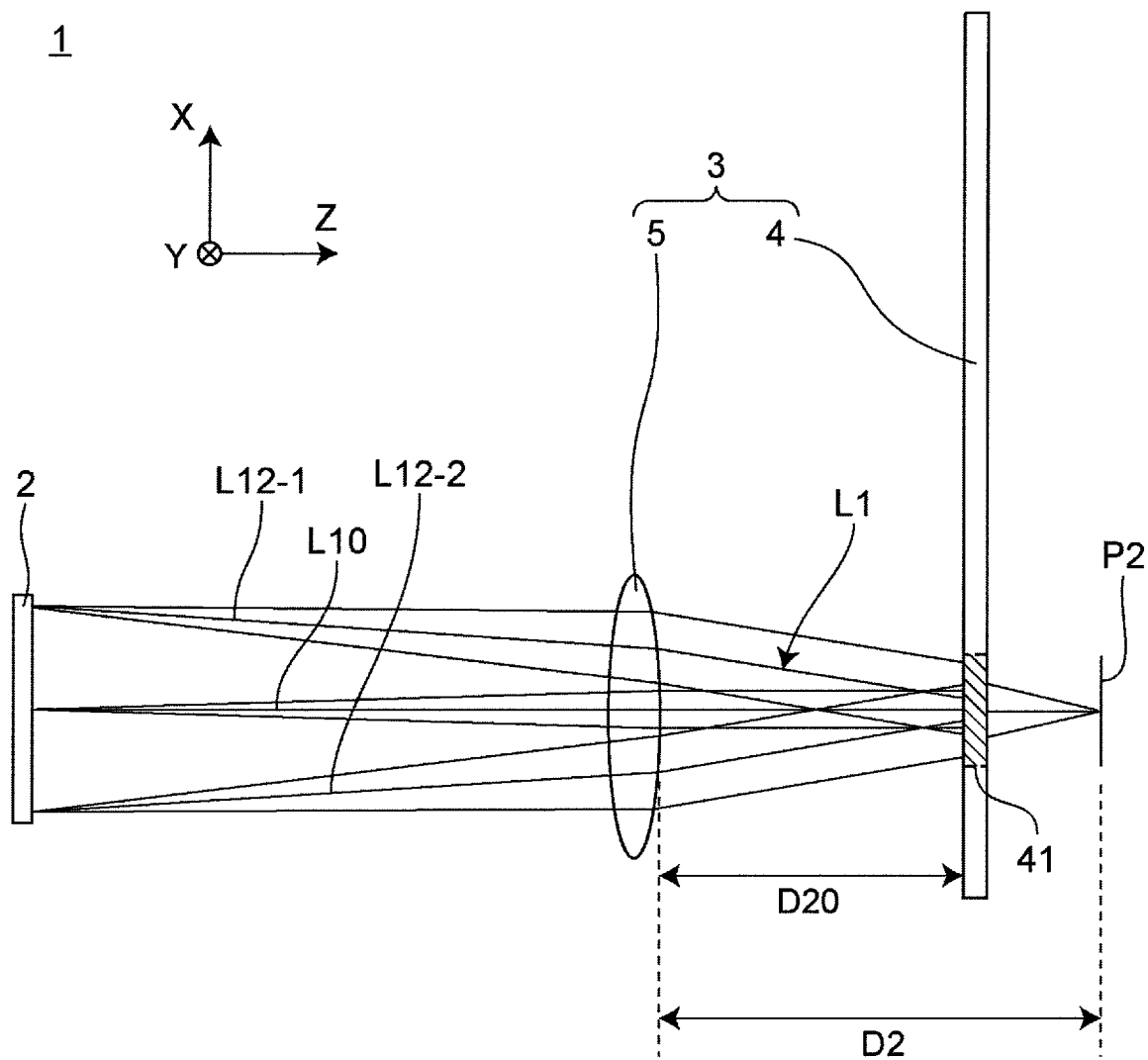
FIG. 8 is an explanatory view of a position of an entrance pupil in the XZ plane of a projection optical system of an image display device of variation 3.

FIG. 8 shows the image display device 1 of variation 3. Especially, FIG. 8 is an explanatory view of the position of the entrance pupil P2 in the XZ plane of an optical system 3 of the image display device 1 of variation 3. In the optical system 3 of the image display device 1 of variation 3, in the optical path of the image light ray L1 projected by the projection optical system 5, the distance D2 from the projection optical system 5 to the entrance pupil P2 of the projection optical system 5 relative to the display element 2 in the plane perpendicular to the second axis (the XZ plane perpendicular to the Y axis) is longer than the distance D20 from the projection optical system 5 to the in-coupling region 41. In FIG. 8, the projection optical system 5 and the in-coupling region 41 of the light guide 4 are arranged in a straight line. Therefore, the position of the entrance pupil P2 of the projection optical system 5 relative to the display element 2 in the plane perpendicular to the second axis (the XZ plane perpendicular to the Y axis) is on the opposite side of the in-coupling region 41 from the projection optical system 5. Thus, it is not always necessary that the distance D2 and the distance D20 are equal to each other. In other words, it is not always necessary that the position of the entrance pupil P2 is identical to the in-coupling region 41 in a similar manner to the above embodiment.

2.4 Variation 4

Figure 9:
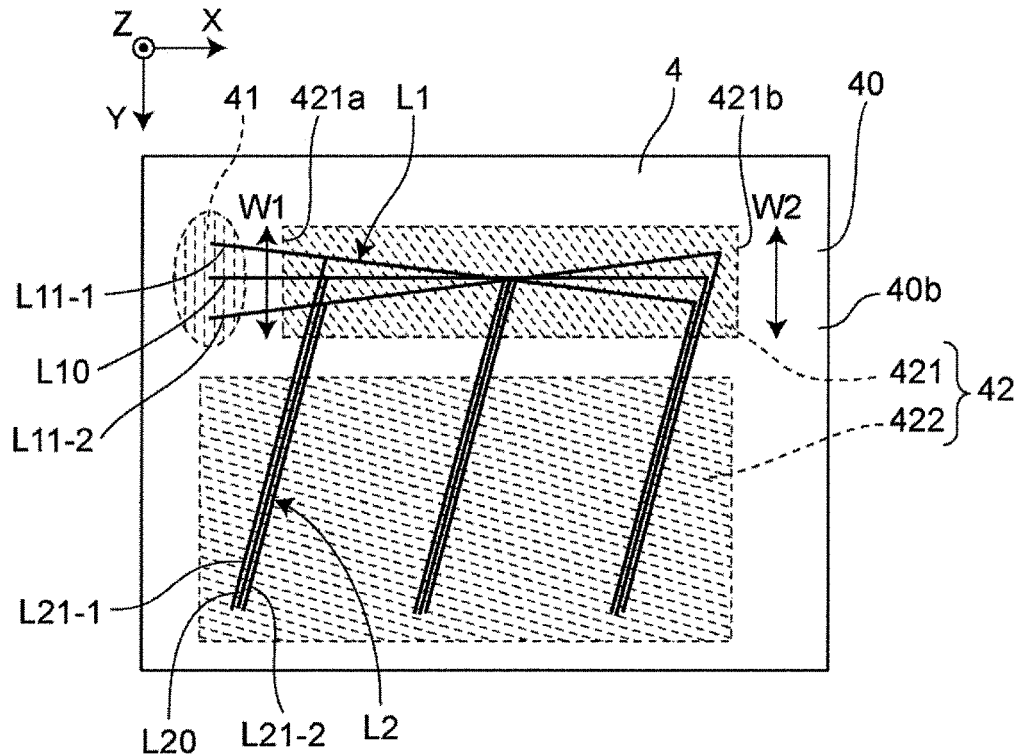
FIG. 9 is a schematic view in the XY plane of a configuration example of a light guide of an image display device of variation 4.

FIG. 9 is a configuration example of the light guide 4 of the display image device of variation 4. Especially, FIG. 9 is a schematic view in the XY plane of the light guide 4. In FIG. 9, similarly to the above embodiment, the first axis is the X axis and the second axis is the Y axis. The first expansion region 421 of the propagation region 42 of FIG. 9 is aligned with the in-coupling region 41 in the first axis (the X axis). The first expansion region 421 allows the image light ray L1 from the in-coupling region 41 to propagate in a direction of the first axis (the X axis) and allows part of the image light ray L1 to travel in the predetermined direction containing the directional component of the second axis (the Y axis) perpendicular to the first axis. In FIG. 9, the predetermined direction contains directional components of the first axis and the second axis, differently from the above embodiment. This means that the predetermined direction is not a direction of the second axis perpendicular to the first axis but a direction which is not perpendicular to the first axis but crosses the first axis. The directional component of the first axis contained in the predetermined direction is a component of a direction from the first expansion region 421 toward the in-coupling region 41.

Figure 10:
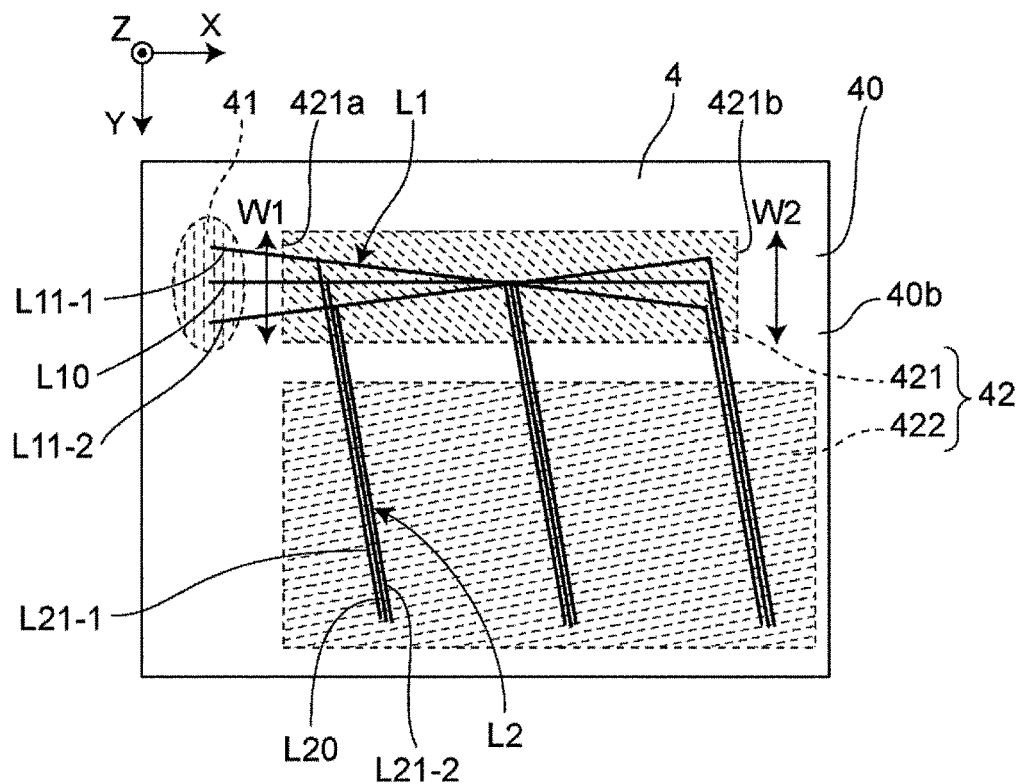
FIG. 10 is a schematic view in the XY plane of another configuration example of the light guide of the image display device of variation 4.

FIG. 10 is another configuration example of the light guide 4 of the image display device of variation 4. Especially, FIG. 10 is a schematic view in the XY plane of the light guide 4. In FIG. 10, similarly to the above embodiment, the first axis is the X axis and the second axis is the Y axis. The first expansion region 421 of the propagation region 42 of FIG. 10 is aligned with the in-coupling region 41 in the first axis (the X axis). The first expansion region 421 allows the image light ray L1 from the in-coupling region 41 to propagate in the direction of the first axis (the X axis) and allows part of the image light ray L1 to travel in the predetermined direction containing the directional component of the second axis (the Y axis) perpendicular to the first axis. In FIG. 10, the predetermined direction contains directional components of the first axis and the second axis, differently from the above embodiment. This means that the predetermined direction is not a direction of the second axis perpendicular to the first axis but a direction which is not perpendicular to the first axis but crosses the first axis. The directional component of the first axis contained in the predetermined direction is a component of a direction from the in-coupling region 41 toward the first expansion region 421.

Apparently, it is not always necessary that the predetermined direction is not identical to the direction of the second axis but may be a direction containing a directional component of the second axis. Especially, the predetermined direction includes the directional component of the first axis and the directional component of the second axis but does not include a directional component of the third axis. In the predetermined direction, an amount of the directional component of the second axis may be equal to or greater than an amount of the directional component of the first axis.

2.5 Variation 5

Figure 11:
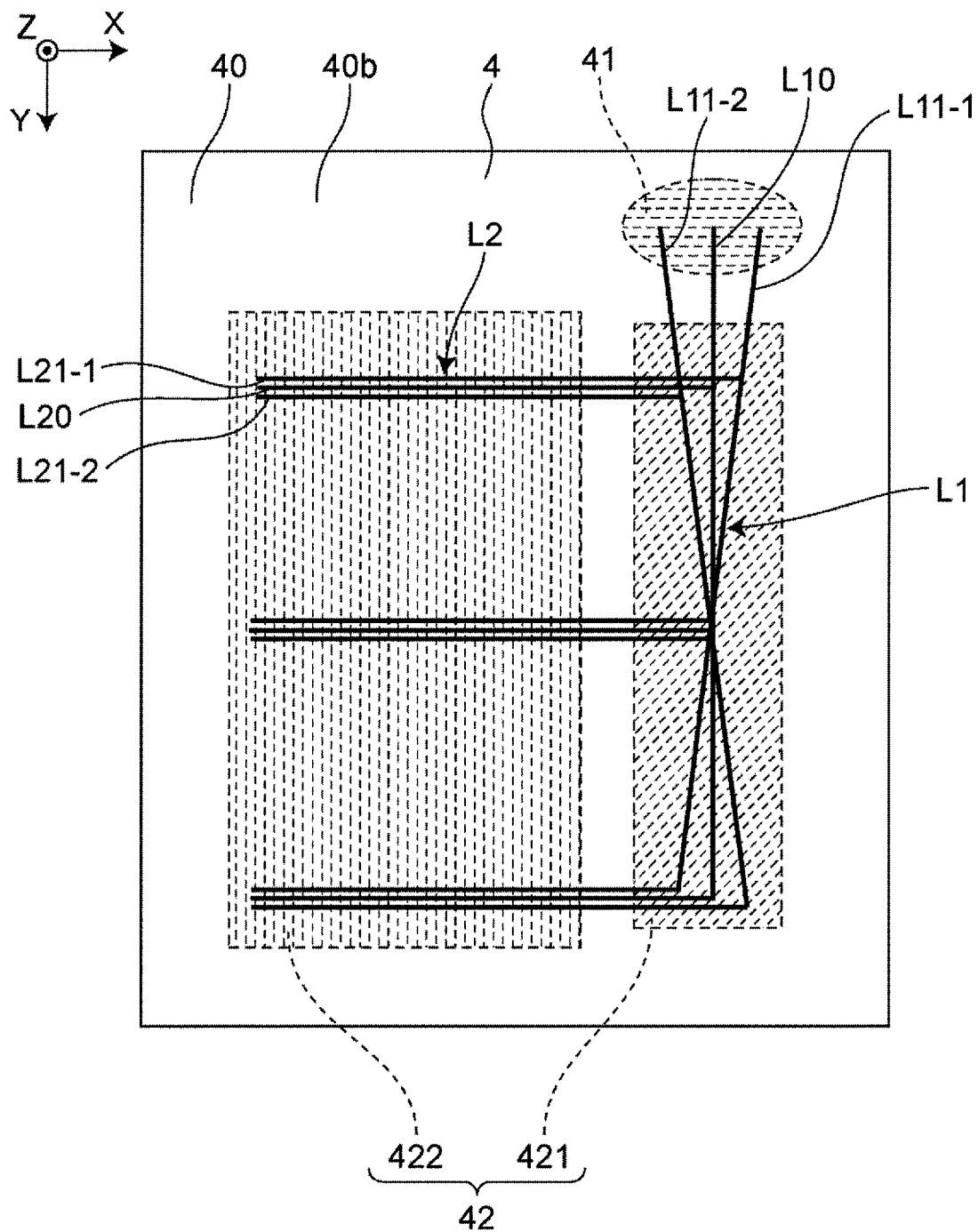
FIG. 11 is a schematic view in the XY plane of a configuration example of a light guide of an image display device of variation 5.

FIG. 11 shows the light guide 4 of the image display device of variation 5. Especially, FIG. 11 is a schematic view in the XY plane of the light guide 4. In the above embodiment, the first axis is the X axis and the second axis is the Y axis. However, in variation 5, the first axis is the Y axis and the second axis is the X axis.

Therefore, in variation 5, the in-coupling region 41 guides the image light ray L1 to the inside of the light guide 4 and allows the image light ray L1 to travel in the direction of the first axis (the Y axis) within the light guide 4. The in-coupling region 41 has an ellipse shape in the XY plane, as well as a major axis thereof is along the first axis (the Y axis) and a minor axis is along the second axis (the X axis).

The first expansion region 421 of the propagation region 42 is aligned with the in-coupling region 41 in the first axis (the Y axis). The first expansion region 421 allows the image light ray L1 from the in-coupling region 41 to propagate in the direction of the first axis (the Y axis) and allows part of the image light ray L1 to travel in the predetermined direction containing the directional component of the second axis (the X axis) perpendicular to the first axis. In variation 5, the predetermined direction contains the directional component of the second axis and is identical to the second axis.

The second expansion region 422 of the propagation region 42 is aligned with the first expansion region 421 in the second axis (the X axis). The second expansion region 422 allows the image light ray L2 from the first expansion region 421 to propagate in the predetermined direction and allows part of the image light ray L2 to emerge from the light guide 4 toward the field of view region 7.

In the light guide 4 of variation 5, it is possible to downsize the propagation region 42 (especially, the first expansion region 421) of the light guide 4 in the X axis. This enables downsizing the light guide 4.

2.6 Variation 6

Figure 12:
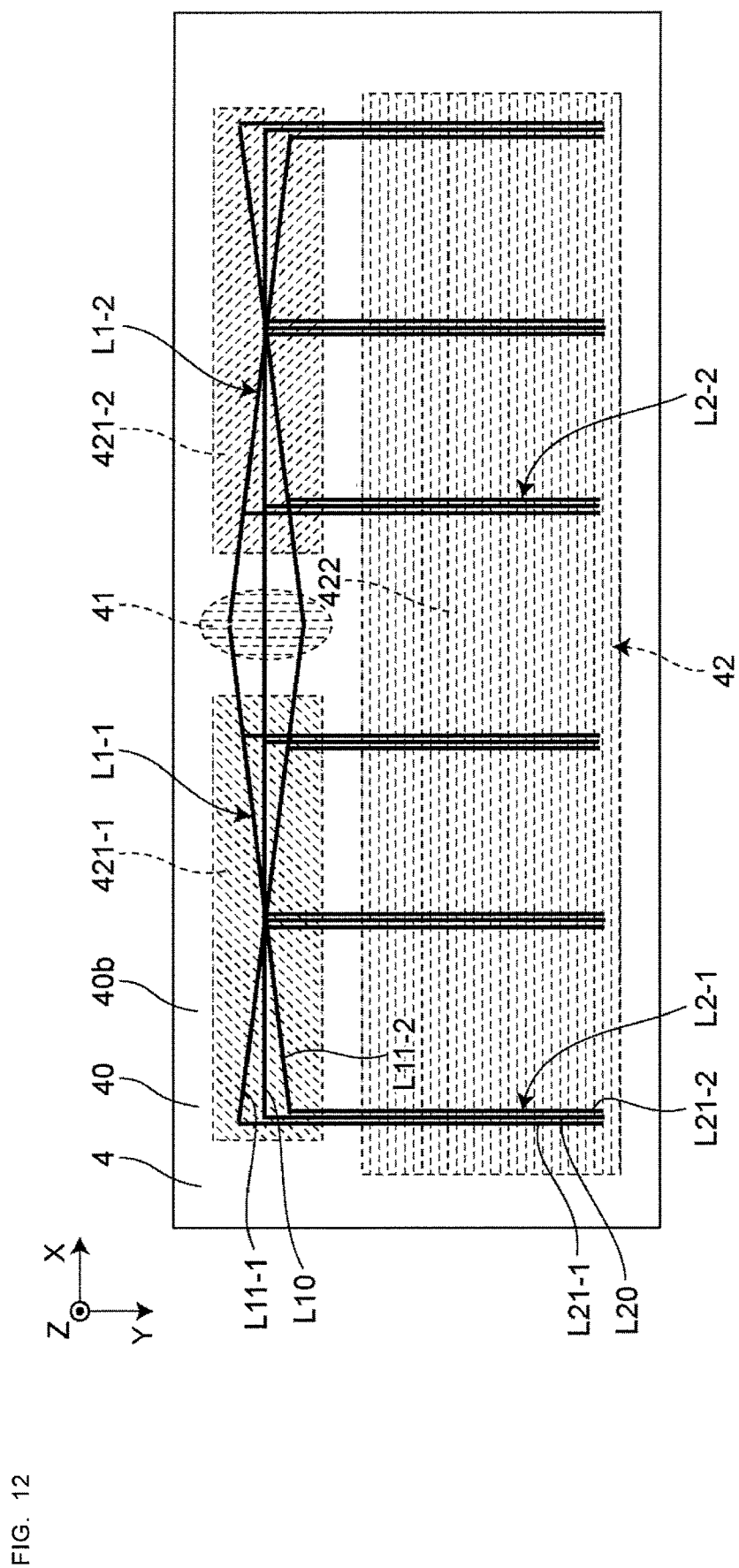
FIG. 12 is a schematic view in the XY plane of a configuration example of a light guide of an image display device of variation 6.

FIG. 12 shows the light guide 4 of the image display device of variation 6. Especially, FIG. 12 is a schematic view in the XY plane of the configuration example of the light guide 4. In variation 6, similarly to the above embodiment, the first axis is the X axis and the second axis is the Y axis.

The light guide 4 of FIG. 12 includes the in-coupling region 41 and the propagation region 42 as components or elements for guiding the image light ray L1 from the display element 2 toward the field of view region 7 of the user.

The in-coupling region 41 is configured to guide the image light ray L1 to the inside of the light guide 4 and allow the image light ray L1 to travel in a direction of the first axis within the light guide 4. In detail, the in-coupling region 41 produces two image light rays L1-1, L1-2 traveling in different directions of the first axis, from the image light ray L1 incident on the in-coupling region 41. The image light ray L1-1 travels in a first direction of the first axis (the left direction in FIG. 12) and the image light ray L1-2 travels in a second direction opposite to the first direction (the right direction in FIG. 12). The in-coupling region 41 is constituted by a periodic structure causing diffraction of the image light ray L1. The periodic structure of the in-coupling region 41 includes, for example, a transmission diffraction grating.

The propagation region 42 includes a pair of first expansion regions 421-1, 421-2 and the second expansion region 422. The pair of first expansion regions 421-1, 421-2 are arranged in a direction of the first axis. As shown in FIG. 12, the pair of first expansion regions 421-1, 421-2 are located on the both side of the in-coupling region 41 in the first axis. A first one of the pair of first expansion regions 421-1, 421-2 (the first expansion region 421-1) is configured to allow the image light ray L1-1 from the in-coupling region 41 to propagate in the first direction and to allow part of the image light ray L1-1 to travel in the predetermined direction containing the directional component of the second axis (in FIG. 12, the direction of the second axis). As shown in FIG. 12, the first expansion region 421-1 is configured to replicate the pupil of the image light ray L1 projected by the projection optical system 5 in the first axis to expand the pupil, by dividing the image light ray L1-1 into a plurality of parallel image light rays L2-1 traveling in the predetermined direction. A second one of the pair of first expansion regions 421-1, 421-2 (the first expansion region 421-2) is configured to allow the image light ray L1-2 from the in-coupling region 41 to propagate in the second direction and to allow part of the image light ray L1-2 to travel in the predetermined direction containing the directional component of the second axis (in FIG. 12, the direction of the second axis). As shown in FIG. 12, the first expansion region 421-2 is configured to replicate the pupil of the image light ray L1 projected by the projection optical system 5 in the first axis to expand the pupil, by dividing the image light ray L1-2 into a plurality of parallel image light rays L2-2 traveling in the predetermined direction. The first expansion regions 421-1, 421-2 are constituted by periodic structures causing diffraction of the image light rays L1-1, L1-2. The periodic structures of the first expansion regions 421-1, 421-2 include reflection diffraction gratings, for example.

As shown in FIG. 12, the second expansion region 422 is aligned with the pair of first expansion regions 421-1, 421-2 in the second axis (the Y axis). In other words, the second expansion region 422 is a second expansion region common to the pair of first expansion regions 421-1, 421-2. The second expansion region 422 is configured to allow the image light rays L2-1, L2-2 from the pair of first expansion regions 421-1, 421-2 to propagate in the predetermined direction, and to allow part of the image light rays L2-1, L2-2 to emerge from the light guide 4 toward the field of view region 7. The second expansion region 422 is configured to replicate the pupil of the image light ray L1 projected by the projection optical system 5 in the second axis to expand the pupil, by dividing the image light rays L2-1, L2-2 into a plurality of parallel image light rays traveling from the light guide 4 toward the field of view region 7. The second expansion region 422 is constituted by a periodic structure causing diffraction of the image light rays L2-1, L2-2. The periodic structure of the second expansion region 422 includes a reflection diffraction grating, for example. The second expansion region 422 is formed in the first surface 40a of the body 40, for example. The diffraction grating of the second expansion region 422 may include a plurality of recesses or protrusions which extend along a direction of the first axis and are arranged along a direction of the second axis at a predetermined interval, for example. Note that, the second expansion region 422 may include a region where the diffraction grating is not present, in the predetermined direction containing the directional component of the second axis of the in-coupling region 41 (in FIG. 12, the direction of the second axis). The second expansion region 422 may be constituted by a pair of second expansion regions 422-1, 422-2 corresponding to the pair of first expansion regions 421-1, 421-2.

As described above, in variation 6, the propagation region 42 includes the pair of first expansion regions 421-1, 421-2 arranged in a direction of the first axis. A first one of the pair of first expansion regions 421-1, 421-2 allows the image light ray L1-1 to propagate in the first direction along the first axis and directs part of the image light ray L1-1 in the predetermined direction. A second one of the pair of first expansion regions 421-1, 421-2 allows the image light ray L1-2 to propagate in the second direction opposite to the first direction and directs part of the image light ray L1-2 in the predetermined direction. The second expansion region 422 allows the image light rays L2-1, L2-2 from the pair of first expansion regions 421-1, 421-2 to propagate in the predetermined direction and allows part of the image light rays L2-1, L2-2 to emerge from the light guide 4 toward the field of view region 7. Accordingly, the configuration enables expansion of the field of view region 7.

2.7 Variation 7

Figure 13:
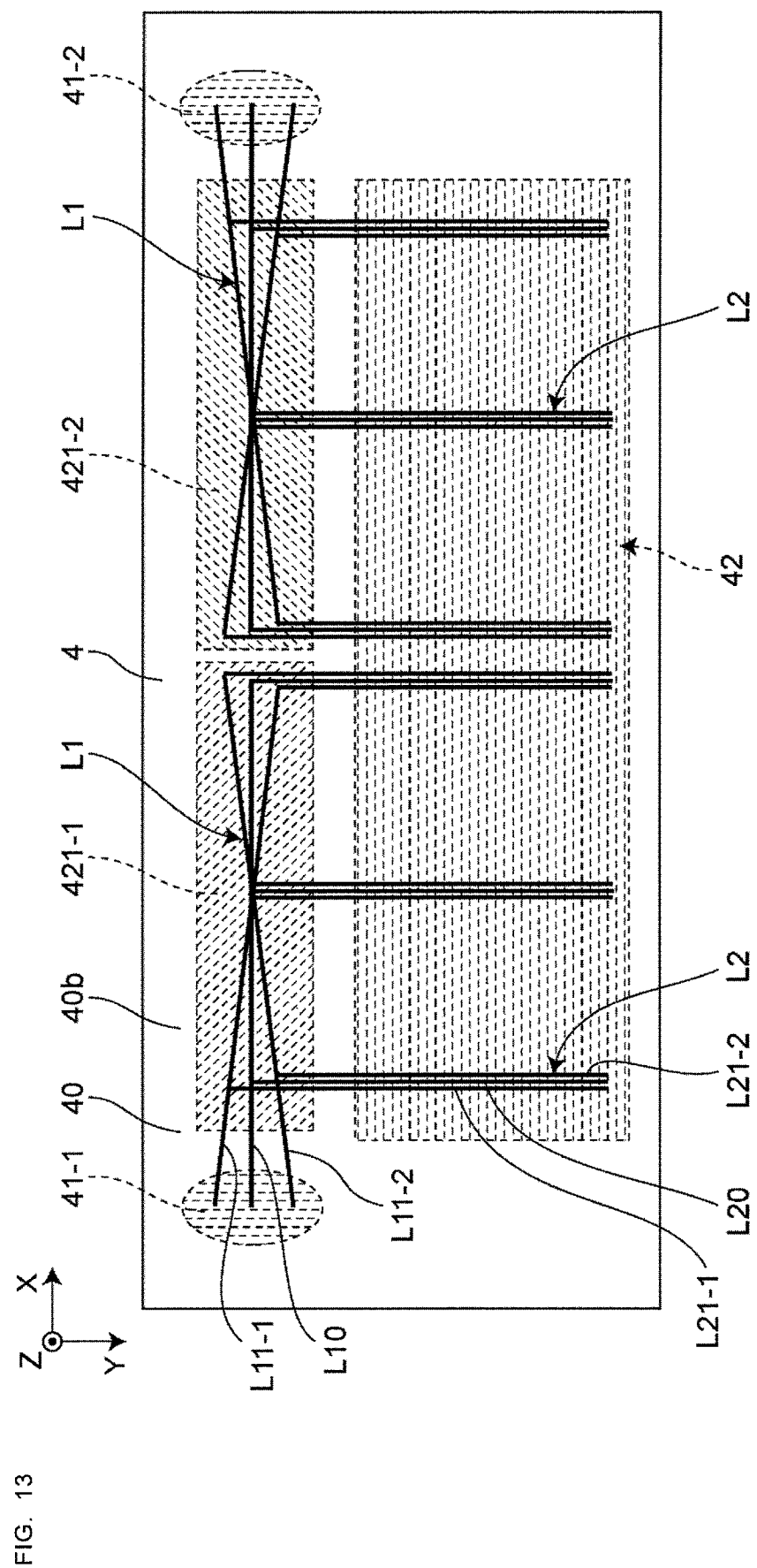
FIG. 13 is a schematic view in the XY plane of a configuration example of a light guide of an image display device of variation 7.

FIG. 13 shows the light guide 4 of the image display device of variation 7. Especially, FIG. 13 is a schematic view in the XY plane of a configuration example of the light guide 4. In variation 7, similarly to the above embodiment, the first axis is the X axis and the second axis is the Y axis.

The light guide 4 of FIG. 13 includes a plurality of in-coupling regions 41 and the propagation region 42 as components or elements for guiding the image light ray L1 from the display element 2 toward the field of view region 7 of the user. The image display device of variation 7 includes a plurality of display elements 2 respectively corresponding to the plurality of in-coupling regions 41, and a plurality of projection optical systems 5 respectively located between the plurality of in-coupling regions 41 and the plurality of display elements 2.

The plurality of in-coupling regions 41 includes a first in-coupling region 41-1 and a second in-coupling region 41-2 which are arranged in a direction of the first axis. The first in-coupling region 41-1 and the second in-coupling region 41-2 guide the image light rays L1 to the inside of the light guide 4 and allow them to travel in the directions of the first axis within the light guide 4. In detail, the first in-coupling region 41-1 guides the image light ray L1 to the inside of the light guide 4 and allows the image light ray L1 to travel in a first direction of the first axis (the right direction in FIG. 13) within the light guide 4. The second in-coupling region 41-2 guides the image light ray L1 to the inside of the light guide 4 and allows the image light ray L1 to travel in a second direction opposite to the first direction (the left direction in FIG. 13) within the light guide 4. The first in-coupling region 41-1 and the second in-coupling region 41-2 are constituted by periodic structures causing diffraction of the image light rays L1. The periodic structures of the first in-coupling region 41-1 and the second in-coupling region 41-2 include, for example, transmission diffraction gratings.

The propagation region 42 includes a pair of first expansion region 421-1, 421-2 arranged in a direction of the first axis. As shown in FIG. 13, the pair of first expansion regions 421-1, 421-2 are located between the first in-coupling region 41-1 and the second in-coupling region 41-2 in the first axis. The first expansion regions 421-1, 421-2 are adjacent to the first in-coupling region 41-1 and the second in-coupling region 41-2, respectively. A first one of the pair of first expansion regions 421-1, 421-2 (the first expansion region 421-1) allows the image light ray L1 from the first in-coupling region 41-1 to propagate in the first direction and directs part of the image light ray L1 in the predetermined direction including a directional component of the second axis (in FIG. 13, a direction of the second axis). As shown in FIG. 13, the first expansion region 421-1 replicates the pupil of the image light ray L1 projected by the projection optical system 5 in the first axis to expand the pupil, by dividing the image light ray L1 into a plurality of parallel image light rays L2 traveling in the predetermined direction. A second one of the pair of first expansion regions 421-1, 421-2 (the first expansion region 421-2) allows the image light ray L1 from the second in-coupling region 41-2 to propagate in the second direction and directs part of the image light ray L1 in the predetermined direction including a directional component of the second axis (in FIG. 13, a direction of the second axis). As shown in FIG. 13, the first expansion region 421-2 replicates the pupil of the image light ray L1 projected by the projection optical system 5 in the first axis to expand the pupil, by dividing the image light ray L1 into a plurality of parallel image light rays L2 traveling in the predetermined direction. The pair of first expansion regions 421-1, 421-2 are constituted by periodic structures causing diffraction of the image light ray L1. The periodic structures of the pair of first expansion regions 421-1, 421-2 include, for example, reflection diffraction gratings. Additionally, the light guide may include a light shielding wall between the first expansion region 421-1 and the first expansion region 421-2 in order to prevent the image light ray L1 from the first in-coupling region 41-1 from reaching the first expansion region 421-2 and to prevent the image light ray L1 from the second in-coupling region 41-2 from reaching the first expansion region 421-1. As shown in FIG. 13, the second expansion region 422 is arranged to be aligned with the pair of first expansion regions 421-1, 421-2 in the second axis (the Y axis). Thus, the second expansion region 422 is a second expansion region common to the pair of first expansion regions 421-1, 421-2. The second expansion region 422 allows the image light rays L2 from the pair of first expansion regions 421-1, 421-2 to propagate in the predetermined direction and allows part of the image light rays L2 to emerge from the light guide 4 toward the field of view region 7. The second expansion region 422 replicates the pupils of the image light rays L1 projected by the projection optical systems 5 in the second axis to expand them, by dividing the image light rays L2 into a plurality of parallel image light rays traveling from the light guide 4 toward the field of view region 7. The second expansion region 422 is constituted by a periodic structure causing diffraction of the image light ray L2. The periodic structure of the second expansion region 422 includes, for example, a reflection diffraction grating.

As described above, in variation 7, the light guide 4 includes the plurality of in-coupling regions 41 including the first in-coupling region 41-1 and the second in-coupling region 41-2. The propagation region 42 includes the pair of first expansion regions 421-1, 421-2 arranged in the first axis. The first one of the pair of first expansion regions 421-1, 421-2 (the first expansion region 421-1) is configured to allow the image light ray L1 to propagate in the first direction of the first axis and direct part of the image light ray L1 in the predetermined direction including the directional component of the second axis. The second one of the pair of first expansion regions 421-1, 421-2 (the first expansion region 421-2) is configured to allow the image light ray L1 to propagate in the second direction opposite to the first direction and direct part of the image light ray L1 in the predetermined direction including the directional component of the second axis. The second expansion region 422 is configured to allow the image light rays L2 from the pair of first expansion regions 421-1, 421-2 to propagate in the predetermined direction and allow part of the image light rays L2 to emerge from the light guide 4 toward the field of view region 7. Accordingly, this configuration can expand the field of view region 7.

2.8 Variation 8

Figure 14:
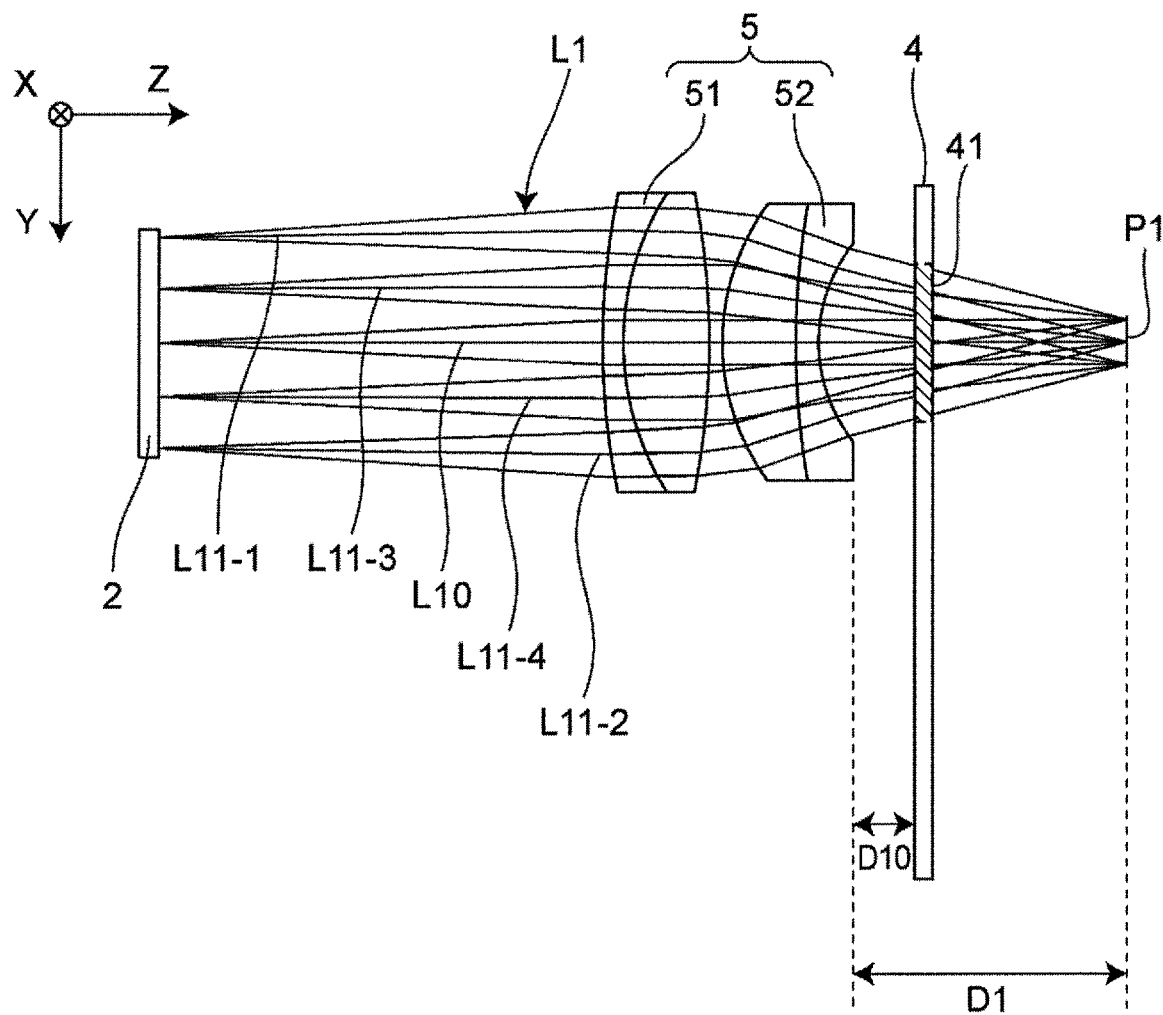
FIG. 14 is an explanatory view of a position of an entrance pupil in the YZ plane of a projection optical system of an image display device of variation 8.
Figure 15:
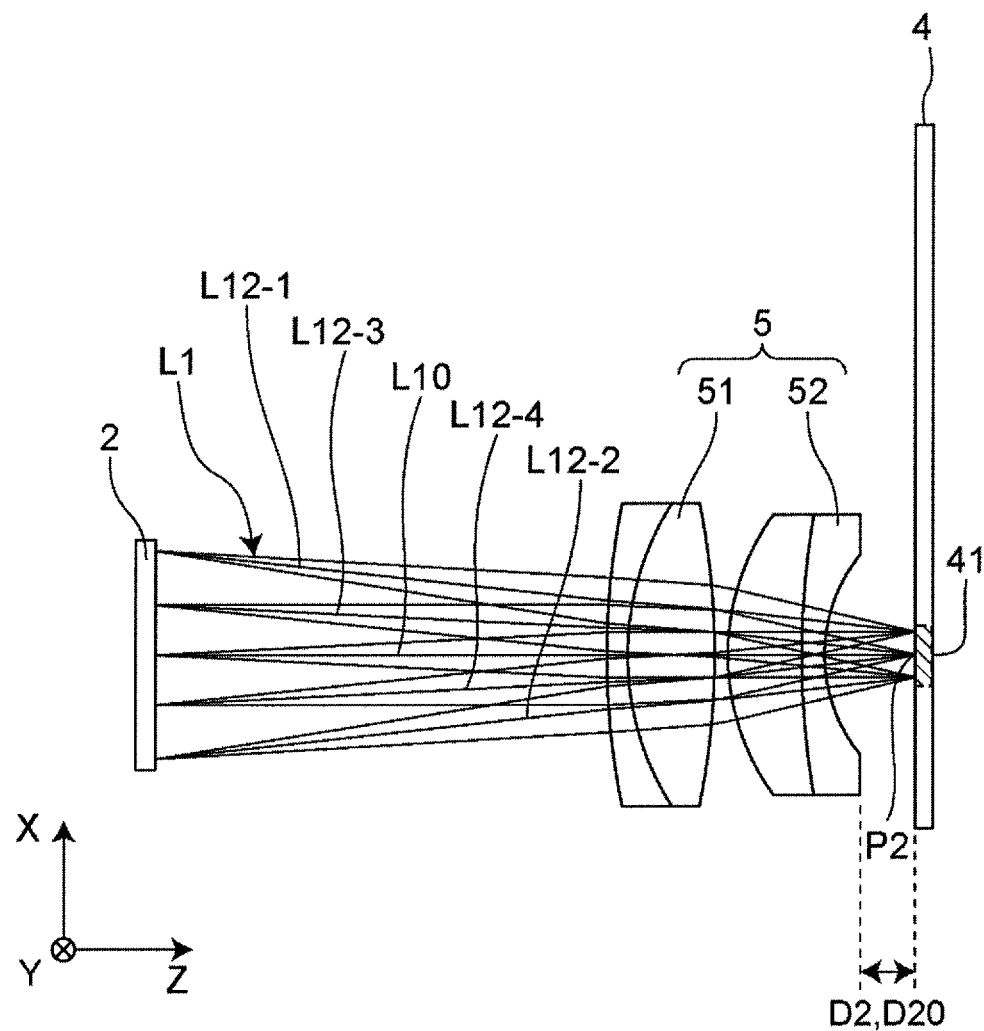
FIG. 15 is an explanatory view of a position of the entrance pupil in the XZ plane of the projection optical system of FIG. 14.

FIG. 14 and FIG. 15 show the projection optical system 5 of the image display device of variation 8. Especially, FIG. 14 is an explanatory view of the position of the entrance pupil P1 in the YZ plane of the projection optical system 5 of the image display device of variation 8. FIG. 15 is an explanatory view of the position of the entrance pupil P2 in the XZ plane of the projection optical system 5 of variation 8. Note that, in FIG. 14 and FIG. 15, to illustrate the in-coupling region 41 in an easy-to-understand way, part of the light guide 4 corresponding to the in-coupling region 41 is designated by hatching.

In variation 8, the projection optical system 5 is configured to allow the image light ray L1 from the display element 2 to be incident on the light guide 4. The projection optical system 5 is located between the display element 2 and the in-coupling region 41 of the light guide 4. The projection optical system 5 includes a first optical element 51 and a second optical element 52 as a plurality of optical elements. For example, the first optical element 51 is a compound lens where a negative meniscus lens and biconvex lens are combined, and the second optical element 52 is a compound lens where a positive meniscus lens and a negative meniscus lens are combined.

The projection optical system 5 of FIG. 14 and FIG. 15 is configured so that the distance D1 from the projection optical system 5 to the entrance pupil P1 of the projection optical system 5 relative to the display element 2 in the plane perpendicular to the first axis (the YZ plane perpendicular to the X axis) in the optical path of the image light ray L1 (see FIG. 14) is longer than the distance D2 from the projection optical system to the entrance pupil P2 of the projection optical system 5 relative to the display element 2 in the plane perpendicular to the second axis (the XZ plane perpendicular to the Y axis) in the optical path of the image light ray L1 (see FIG. 15). By this configuration, dimensions of the propagation region 42 can be reduced and additionally a dimension in the first axis (the X axis) of the in-coupling region 41 can be reduced.

As shown in FIG. 14, in the optical path of the image light ray L1 projected by the projection optical system 5, the distance D1 from the projection optical system 5 to the entrance pupil P1 of the projection optical system 5 relative to the display element 2 in the plane perpendicular to the first axis is longer than the distance D10 from the projection optical system 5 to the in-coupling region 41. Accordingly, in FIG. 14, the position of the entrance pupil P1 of the projection optical system 5 relative to the display element 2 in the plane perpendicular to the first axis (the YZ plane perpendicular to the X axis) is on the opposite side of the in-coupling region 41 from the projection optical system 5. Further, the position of the entrance pupil P1 is set to allow the light beams from the respective points of the display element 2 constituting the image light ray L1 to converge and diverge within the first expansion region 421 of the propagation region 42. In detail, as shown in FIG. 14, the image light ray L1 incident on the in-coupling region 41 from the projection optical system 5 includes the main light beam L10 corresponding to the center of the image and the plurality of auxiliary light beams L11-1, L11-2, L11-3, L11-4, . . . , L11-$n$ (hereinafter, collectively designated by reference sign L11) which come close to the main light beam L10 in the second axis (the Y axis) as traveling from the projection optical system 5 to the in-coupling region 41. The plurality of auxiliary light beams L11 cross the main light beam L10 within the first expansion region 421 of the propagation region 42. As described above, the light beams from the respective points of the display element 2 constituting the image light ray L1 (the main light beam L10 and the auxiliary light beams L11) are made to converge and diverge within the first expansion region 421 of the propagation region 42. This can decrease a size necessary for the propagation region 42 (especially the first expansion region 421) to allow propagation of the image light ray L1 from the display element 2.

As shown in FIG. 15, in the optical path of the image light ray L1 projected by the projection optical system 5, the distance D2 from the projection optical system 5 to the entrance pupil P2 of the projection optical system 5 relative to the display element 2 in the plane perpendicular to the second axis is equal to the distance D20 from the projection optical system 5 to the in-coupling region 41. Accordingly, in FIG. 15, the position of the entrance pupil P2 of the projection optical system 5 relative to the display element 2 in the plane perpendicular to the second axis (the XZ plane perpendicular to the Y axis) corresponds to a position of the in-coupling region 41 in the first surface 40$a$ of the light guide 4. Therefore, the light beams from the respective points of the display element 2 constituting the image light ray L1 converge on the in-coupling region 41. In detail, as shown in FIG. 15 the image light ray L1 incident on the in-coupling region 41 from the projection optical system 5 includes the main light beam L10 corresponding to the center of the virtual image, and a plurality of auxiliary light beams L12-1, L12-2, L12-3, L12-4, . . . , L12-$n$ (hereinafter collectively designated by reference sign L12) which come close to the main light beam L10 in the first axis (the X axis) as traveling from the projection optical system 5 to the in-coupling region 41. The plurality of auxiliary light beams L12 cross the main light beam L10 at the in-coupling region 41.

As described above, the projection optical system 5 may be constituted by a combination of a plurality of optical elements so that the distance from the projection optical system 5 to the entrance pupil P1 of the projection optical system 5 relative to the display element 2 in the plane perpendicular to the first axis (the YZ plane perpendicular to the X axis) in the optical path of the image light ray L1 is longer than the distance from the projection optical system 5 to the entrance pupil P2 of the projection optical system 5 relative to the display element 2 in the plane perpendicular to the second axis (the XZ plane perpendicular to the Y axis) in the optical path of the image light ray L1.

2.9 Other Variations

In the above embodiment, the projection optical system 5 and the in-coupling region 41 of the light guide 4 are arranged in a straight line. However, it is not always necessary that the projection optical system 5 and the in-coupling region 41 of the light guide 4 are arranged in a straight line. In other words, the optical path of the image light ray L1 from the projection optical system 5 to the in-coupling region 41 of the light guide 4 always need not be straight. For example, the image light ray L1 from the projection optical system 5 may be reflected by a reflective plate to be incident on the in-coupling region 41 of the light guide 4. In this arrangement, the optical path of the image light ray L1 from the projection optical system 5 to the in-coupling region 41 of the light guide 4 is not straight but an L-shape, for example. Also in this arrangement, the light guide 4 can be downsized by satisfying a condition where in the optical path of the image light ray L1 projected by the projection optical system 5, the distance from the projection optical system 5 to the entrance pupil P1 of the projection optical system 5 relative to the display element 2 in the plane perpendicular to the first axis is longer than the distance from the projection optical system 5 to the in-coupling region 41. Further, the distance from the projection optical system 5 to the entrance pupil P1 of the projection optical system 5 relative to the display element 2 in the plane perpendicular to the first axis in the optical path of the image light ray L1 may be set to be longer than the distance from the projection optical system 5 to the entrance pupil P2 of the projection optical system 5 relative to the display element 2 in the plane perpendicular to the second axis in the optical path of the image light ray L1.

In one variation, it is not always necessary that the in-coupling region 41 of the light guide 4 is provided to the first surface 40$a$ or the second surface 40$b$ of the body 40. The in-coupling region 41 may be formed in a side surface (edge surface) of the body 40. For example, the in-coupling region 41 may be constituted by a surface inclined relative to the thickness direction of the body 40. According to this arrangement, the in-coupling region 41 can guide the image light ray L1 to the inside of the light guide 4 and allow the image light ray L1 to travel in the direction of the first axis within the light guide 4. In this arrangement, the in-coupling region 41 always need not be constituted by a periodic structure causing diffraction of the image light ray L1, but may be constituted by a surface for refracting the image light ray L1 in a direction of the first axis.

As described above, the first expansion region 421 of the propagation region 42 allows the image light ray L1 from the in-coupling region 41 to propagate in the direction of the first axis and allows part of the image light ray L1 to travel in the predetermined direction including the directional component of the second axis perpendicular to the first axis. In the above embodiment, the first axis is the X axis and the second axis is the Y axis. However, the first axis may be the X axis or the Y axis, and the second axis may be the Z axis. In this arrangement, the light guide 4 performs pupil expansion in the first axis or the second axis. In this arrangement, the second expansion region 422 is optional. Additionally, the second axis may not be perpendicular to the first axis. For example, when the first axis is the X axis, the second axis may be not the Y axis or the Z axis but an axis crossing the X axis at 45 degrees.

In one variation, W1 and W2 may satisfy the relation of 0.4<W1/W2<1.8. Note that, it is more preferable that W1 and W2 satisfy the relation of W1/W2=1.

In one variation, the second expansion region 422 may not be limited to a reflection diffraction grating but may be a transmission diffraction grating, or a volume hologram (holographic diffraction grating).

3. Aspects

As apparent from the above embodiment and variations, the present disclosure includes the following aspects. Hereinafter, reference signs in parenthesis are attached for the purpose of clearly showing correspondence with the embodiments only.

A first aspect is an optical system (3) including: a projection optical system (5) for projecting an image light ray (L1) which is output from a display element (2) and forms an image; and a light guide (4) for guiding the image light ray (L1) projected by the projection optical system (5) toward a field of view region (7) of a user as a virtual image. The light guide (4) includes: an in-coupling region (41) for guiding the image light ray (L1) to an inside of the light guide (4) and allowing the image light ray (L1) to travel in a direction of a first axis within the light guide (4); and a propagation region (42) for allowing the image light ray (L1) from the in-coupling region (41) to propagate in the direction of the first axis, and allowing part of the image light ray (L1) to travel in a predetermined direction including a directional component of a second axis perpendicular to the first axis. In an optical path of the image light ray (L1) projected by the projection optical system (5), a distance (D1) from the projection optical system (5) to an entrance pupil (P1) of the projection optical system (5) relative to the display element (2) in a plane perpendicular to the first axis is longer than a distance (D10) from the projection optical system (5) to the in-coupling region (41). Accordingly, this aspect enables downsizing the light guide (4), especially, the propagation region (42).

A second aspect is an optical system (3) based on the first aspect. In the second aspect, the distance (D1) from the projection optical system (5) to the entrance pupil (P1) of the projection optical system (5) relative to the display element (2) in the plane perpendicular to the first axis in the optical path of the image light ray (L1) is longer than a distance (D2) from the projection optical system (5) to the entrance pupil (P2) of the projection optical system (5) relative to the display element (2) in a plane perpendicular to the second axis in the optical path of the image light ray (L1). Accordingly, this aspect enables downsizing the light guide (4). In the second aspect, when the distance from the projection optical system (5) to the entrance pupil (P1) of the projection optical system (5) relative to the display element (2) in the plane perpendicular to the first axis in the optical path of the image light ray (L1) is designated by D1, and the distance from the projection optical system (5) to the entrance pupil (P2) of the projection optical system (5) relative to the display element (2) in the plane perpendicular to the second axis in the optical path of the image light ray (L1) is designated by D2, D1 and D2 may satisfy a relation of $3.0 < D1/D2 < 100$. In this configuration, it is possible to appropriately set a position where a plurality of auxiliary light beams (L11-1, L11-2) cross a main light beam (L10) within the propagation region (42). The light guide (4) can be downsized.

A third aspect is an optical system (3) based on the first or second aspect. In the third aspect, the light guide (4) has a plate shape. The first axis, the second axis, and the predetermined direction each are perpendicular to a thickness direction of the light guide (4). Accordingly, this aspect can decrease the dimension in the second axis of the light guide (4).

A fourth aspect is an optical system (3) based on any one of the first to third aspects. In the fourth aspect, the image light ray (L1) incident on the in-coupling region (41) from the projection optical system (5) includes a main light beam (L10) corresponding to a center of the virtual image, and a plurality of auxiliary light beams (L11-1, L11-2) which come close to the main light beam (L10) in a direction of the second axis as traveling from the projection optical system (5) to the in-coupling region (4). The plurality of auxiliary light beams (L11-1, L11-2) cross the main light beam (10) within the propagation region (42). Accordingly, this aspect enables downsizing the light guide (4).

A fifth aspect is an optical system (3) based on any one of the first to fourth aspects. In the fifth aspect, a dimension in the second axis of the in-coupling region (41) is larger than a dimension in the first axis of the in-coupling region (41). Accordingly, this aspect enables downsizing the light guide (4).

A sixth aspect is an optical system (3) based on any one of the first to fifth aspects. In the sixth aspect, the propagation region (42) includes a first expansion region (421) which replicates a pupil of the image light ray (L1) projected by the projection optical system (5) in the first axis to expand the pupil, by dividing the image light ray (L1) into a plurality of parallel image light rays (L2) traveling in the predetermined direction. Accordingly, this aspect enables expansion of the pupil in the first axis.

A seventh aspect is an optical system (3) based on the sixth aspect. In the seventh aspect, the first expansion region (421) includes a first end (421a) and a second end (421b) in the first axis. The first end (421a) is closer to the in-coupling region (41) than the second end (421b) is. When a width of an optical path at the first end of the image light ray (L1) is designated by W1 and a width of an optical path at the second end of the image light ray (L1) is designated by W2, W1 and W2 satisfy a relation of $0.4 < W1/W2 < 1.8$. Accordingly, this aspect can downsize the first expansion region (421) of the propagation region (42) and thus can downsize the propagation region (42) of the light guide (4).

An eighth aspect is an optical system (3) based on the sixth or seventh aspect. In the eighth aspect, the propagation region (42) allows the image light ray (L2) from the first expansion region (421) to propagate in the predetermined direction, and allows part of the image light ray (L2) (the image light ray L3) to emerge from the light guide (4) toward the field of view region (7). Accordingly, this aspect can expand the field of view region (7).

A ninth aspect is an optical system (3) based on the eighth aspect. In the ninth aspect, the propagation region (42) includes a second expansion region (422) which replicates the pupil of the image light ray (L1) projected by the projection optical system (5) in the second axis to expand the pupil, by dividing the image light ray (L1) into a plurality of parallel image light rays (L1) traveling from the light guide (4) toward the field of view region (7). Accordingly, this aspect enables expansion of the pupil in the second axis.

A tenth aspect is an optical system (3) based on the ninth aspect. In the tenth aspect, the propagation region (42) includes a pair of the first expansion regions (421-1, 421-2) arranged in a direction of the first axis. A first one of the pair of first expansion regions (421-1, 421-2) allows the image light ray (L1) to propagate in a first direction along the first axis and directs part of the image light ray (L1) in the predetermined direction. A second one of the pair of first expansion regions (421-1, 421-2) allows the image light ray (L1) to propagate in a second direction opposite to the first direction and directs part of the image light ray (L1) in the predetermined direction. The second expansion region (422) allows the image light rays (L2) from the pair of first expansion regions (421-1, 421-2) to propagate in the predetermined direction and allows part of the image light rays (L2) to emerge from the light guide (4) toward the field of view region (7). Accordingly, this aspect enables expansion of the field of view region (7).

An eleventh aspect is an optical system (3) based on any one of the first to tenth aspects. In the eleventh aspect, the in-coupling region (41) includes a periodic structure causing diffraction of the image light ray (L1). Accordingly, this aspect enables downsizing the light guide (4).

A twelfth aspect is an optical system (3) based on any one of the first to eleventh aspects. In the twelfth aspect, the light guide (4) replicates a pupil of the image light ray (L1) projected by the projection optical system (5) to expand the pupil, by dividing the image light ray (L1) incident on the light guide (4) via the in-coupling region (41) in a plurality of parallel image light rays (L1, L2) within the light guide (4) and allowing the plurality of parallel image light rays (L1, L2) to emerge toward the field of view region (7). Accordingly, this aspect enables expansion of the pupil.

A thirteenth aspect is an optical system (3) based on any one of the first to twelfth aspects. In the thirteenth aspect, the projection optical system (5) allows the image light ray (L1) to be incident on the in-coupling region (41) as an approximate collimated light ray. Accordingly, this aspect enables downsizing the light guide (4).

A fourteenth aspect is an image display device (1) including an optical system (3) based on any one of the first to thirteenth aspects and the display element (2). Accordingly, this aspect enables downsizing the light guide (4).

A fifteenth aspect is an image display device (1) based on the fourteenth aspect. In the fifteenth aspect, the display element (2) has characteristics that the image light ray (L1) spreads more widely in the second axis than in the first axis. Accordingly, the position of the entrance pupil (P1) of the projection optical system (5) relative to the display element (2) in the plane perpendicular to the first axis and the position of an entrance pupil (P2) of the projection optical system (5) relative to the display element (2) in the plane perpendicular to the second axis can be made to be different easily by the projection optical system (5).

As above, as examples of techniques in the present disclosure, the embodiments are described. For this purpose, the attached drawings and the description are provided. Therefore, components described in the attached drawings and the description may include not only components necessary for solving problems but also components which are unnecessary for solving problems but useful for exemplifying the above techniques. Note that, such unnecessary components should not be considered as necessary just for the reason why such unnecessary components are described in the attached drawings and the description. Further, the embodiment described above is just prepared for exemplifying the techniques in the present disclosure and thus may be subjected to various modification, replacement, addition, omission, or the like within the scope defined by claims and those equivalent range.

INDUSTRIAL APPLICABILITY

The present disclosure is applicable to optical systems and image display devices. In more detail, the present disclosure is applicable to an optical system for guiding light from a display element to a field of view region of a user, and an image display device including this optical system.

REFERENCE SIGNS LIST

1 Image Display Device
2 Display Element
3 Optical System
4 Light Guide
41 In-coupling Region
42 Propagation Region
421, 421-1, 421-2 First Expansion Region
421a First End
421b Second End
422 Second Expansion Region
5 Projection Optical System
7 Field of View Region
L1 Image Light Ray
L10 Main Light Beam
L11-1, L11-2 Auxiliary Light Beam
P1 Entrance Pupil
P2 Entrance Pupil

The invention claimed is:

1. An optical system comprising:
a projection optical system for projecting an image light ray which is output from a display element and forms an image; and
a light guide for guiding the image light ray projected by the projection optical system toward a field of view region of a user as a virtual image,
the light guide including:
an in-coupling region for guiding the image light ray to an inside of the light guide and allowing the image light ray to travel in a direction of a first axis within the light guide, by diffraction or refraction; and
a propagation region for allowing the image light ray from the in-coupling region to propagate in the direction of the first axis, and allowing part of the image light ray to travel in a predetermined direction including a directional component of a second axis perpendicular to the first axis,
in an optical path of the image light ray projected by the projection optical system, a first distance from the projection optical system to an entrance pupil of the projection optical system relative to the display element in a first plane perpendicular to the first axis being longer than a distance from the projection optical system to the in-coupling region, and being longer than a second distance from the projection optical system to the entrance pupil of the projection optical system relative to the display element in a second plane perpendicular to the second axis in the optical path of the image light ray,
the image light ray incident on the in-coupling region from the projection optical system including a main light beam which is output from a center of the display element and corresponds to a center of the virtual image, a plurality of first auxiliary light beams which are output from edges in a direction of the second axis of the display element and come close to the main light beam in the direction of the second axis as traveling from the projection optical system to the in-coupling region, and a plurality of second auxiliary light beams which are output from edges in a direction of the first axis of the display element and come close to the main light beam in the direction of the first axis as traveling from the projection optical system to the in-coupling region,
the plurality of first auxiliary light beams crossing the main light beam within the propagation region, and
the plurality of second auxiliary light beams crossing the main light beam within the in-coupling region.

2. The optical system of claim 1, wherein
in the optical path of the image light ray projected by the projection optical system, the second distance is equal to the distance from the projection optical system to the in-coupling region.

3. The optical system of claim 1, wherein:
in the optical path of the image light ray projected by the projection optical system, the second distance is longer than the distance from the projection optical system to the in-coupling region.

4. The optical system of claim 1, wherein:
the light guide has a plate shape; and
the first axis, the second axis, and the predetermined direction each are perpendicular to a thickness direction of the light guide.

5. The optical system of claim 1, wherein
a dimension in the second axis of the in-coupling region is larger than a dimension in the first axis of the in-coupling region.

6. The optical system of claim 1, wherein
the propagation region includes a first expansion region which replicates a pupil of the image light ray projected by the projection optical system in the first axis to expand the pupil, by dividing the image light ray into a plurality of parallel image light rays traveling in the predetermined direction.

7. The optical system of claim 6, wherein
the first expansion region includes a first end and a second end in the first axis;
the first end is closer to the in-coupling region than the second end is; and
when a width of an optical path at the first end of the image light ray is designated by W1 and a width of an optical path at the second end of the image light ray is designated by W2, W1 and W2 satisfy a relation of $0.4 < W1/W2 < 1.8$.

8. The optical system of claim 6, wherein
the propagation region allows the image light ray from the first expansion region to propagate in the predetermined direction, and allows part of the image light ray to emerge from the light guide toward the field of view region.

9. The optical system of claim 8, wherein
the propagation region includes a second expansion region which replicates the pupil of the image light ray projected by the projection optical system in the second axis to expand the pupil, by dividing the image light ray from the first expansion region into a plurality of parallel image light rays traveling from the light guide toward the field of view region.

10. The optical system of claim 9, wherein:
the propagation region includes a pair of the first expansion regions arranged in a direction of the first axis;
a first one of the pair of first expansion regions allows the image light ray to propagate in a first direction along the first axis and directs part of the image light ray in the predetermined direction;
a second one of the pair of first expansion regions allows the image light ray to propagate in a second direction opposite to the first direction and directs part of the image light ray in the predetermined direction; and
the second expansion region allows the image light rays from the pair of first expansion regions to propagate in the predetermined direction and allows part of the image light rays to emerge from the light guide toward the field of view region.

11. The optical system of claim 1, wherein
the in-coupling region includes a periodic structure causing diffraction of the image light ray.

12. The optical system of claim 1, wherein
the light guide replicates a pupil of the image light ray projected by the projection optical system to expand the pupil, by dividing the image light ray incident on the light guide via the in-coupling region in a plurality of parallel image light rays within the light guide and allowing the plurality of parallel image light rays to emerge toward the field of view region.

13. The optical system of claim 1, wherein
the projection optical system allows the image light ray to be incident on the in-coupling region as an approximate collimated light ray.

14. An image display device comprising:
the optical system of claim 1; and
the display element.

15. The image display device of claim 14, wherein
the display element has characteristics that the image light ray spreads more widely in the second axis than in the first axis.

* * * * *